United States Patent
Giraud et al.

(10) Patent No.: US 11,552,796 B2
(45) Date of Patent: Jan. 10, 2023

(54) CRYPTOGRAPHIC PROCESSING EVENTS FOR ENCRYPTING OR DECRYPTING DATA

(71) Applicant: IDEMIA FRANCE, Courbevoie (FR)

(72) Inventors: Christophe Giraud, Pessac (FR); Emmanuelle Dottax, Talence (FR)

( * ) Notice: Subject to any disclaimer, the term of this patent is extended or adjusted under 35 U.S.C. 154(b) by 0 days.

(21) Appl. No.: 17/330,554

(22) Filed: May 26, 2021

(65) Prior Publication Data

US 2021/0377025 A1 Dec. 2, 2021

(30) Foreign Application Priority Data

May 27, 2020 (FR) ...................................... 20 05595

(51) Int. Cl.
| | |
|---|---|
| *H04L 29/06* | (2006.01) |
| *G06F 21/00* | (2013.01) |
| *H04L 9/30* | (2006.01) |
| *H04L 9/08* | (2006.01) |
| *H04L 9/32* | (2006.01) |

(52) U.S. Cl.
CPC .......... *H04L 9/3066* (2013.01); *H04L 9/0819* (2013.01); *H04L 9/0869* (2013.01); *H04L 9/3242* (2013.01)

(58) Field of Classification Search
CPC ... H04L 9/3066; H04L 9/0819; H04L 9/0869; H04L 9/3242; H04L 2209/80; H04L 9/14; H04L 9/3013; H04L 9/0841; H04L 9/0866; H04L 9/0877; H04W 12/0431
See application file for complete search history.

(56) References Cited

U.S. PATENT DOCUMENTS

2011/0063093 A1* 3/2011 Fung .................. G06Q 10/0875
340/10.52
2021/0211274 A1* 7/2021 Wright .................... H04L 9/085

OTHER PUBLICATIONS

Frosch Tilman et al How Secure is TextSecure? 2016 IEEE European Symposium on Security and Privacy (EUROS&P), IEEE Mar. 21, 2016 (Mar. 21, 2016), pp. 457-472 XP032899546.
Paul C Van Oorschoi et al On Diffie-Hellman Key Agreement with Short Exponents May 21, 1996 (May 12, 1996) Advances in Cryptology—EUROCRYPT '96. International Conference on the Theory and Application of Cryptographic Techniques. Saragossa, May 12-16, 1996.

(Continued)

*Primary Examiner* — Lisa C Lewis
(74) *Attorney, Agent, or Firm* — Robert Facey

(57) ABSTRACT

A cryptographic method is provided. The cryptographic method comprises an initialisation phase for determining a provisional generator point G' equal to a first product G'=[d']G, where d' is a first random scalar forming a secret key of N bits and G is a generator point of an elliptical curve, and determining a provisional key Q' equal to a second product Q'=[d']Q, where Q is a point of the elliptical curve forming a public key. During an encryption phase a second random scalar forming a second secret key k of M bits, with M<N; a public key P is calculated such that P=[k]G'; a coordinate of an intermediate point SP1, of the elliptical curve, equal to a fourth product SP1=[k]Q'; at least one key by application of a derivation function (F1); and data (T1) are encrypted based on said at least one key.

15 Claims, 11 Drawing Sheets

(56) References Cited

OTHER PUBLICATIONS

Takeshi Koshiba et al Short Exponent Diffie-Hellman Problems Feb. 26, 2004 (Feb. 26, 2004) Ublic Key Cryptography—PKC 2004; [Lecture Notes in Computer Science;;LNCS], Springer-Verlag, Berling/Heidelberg, pp. 173-186.

Khan Haibai et al Identity Confidentiality in 5G Mobile Telephony Systems Nov. 21, 2018 (Nov. 21, 2018) Advances in Databases and Information Systems; [Lecture Notes in Computer Science; Lect. Notes Computer], Springer International Publishing, Cham, pp. 120-142.

Bender Jens et al Security Analysis of the PACE Key-Agreement Protocol Sep. 7, 2009 (Sep. 7, 2009) Big Data Analytics in the Social and Ubiquitous Context : 5th International Workshop on Modeling Social Media, MSN 2014, pp. 34-48.

\* cited by examiner

[Figure 1]
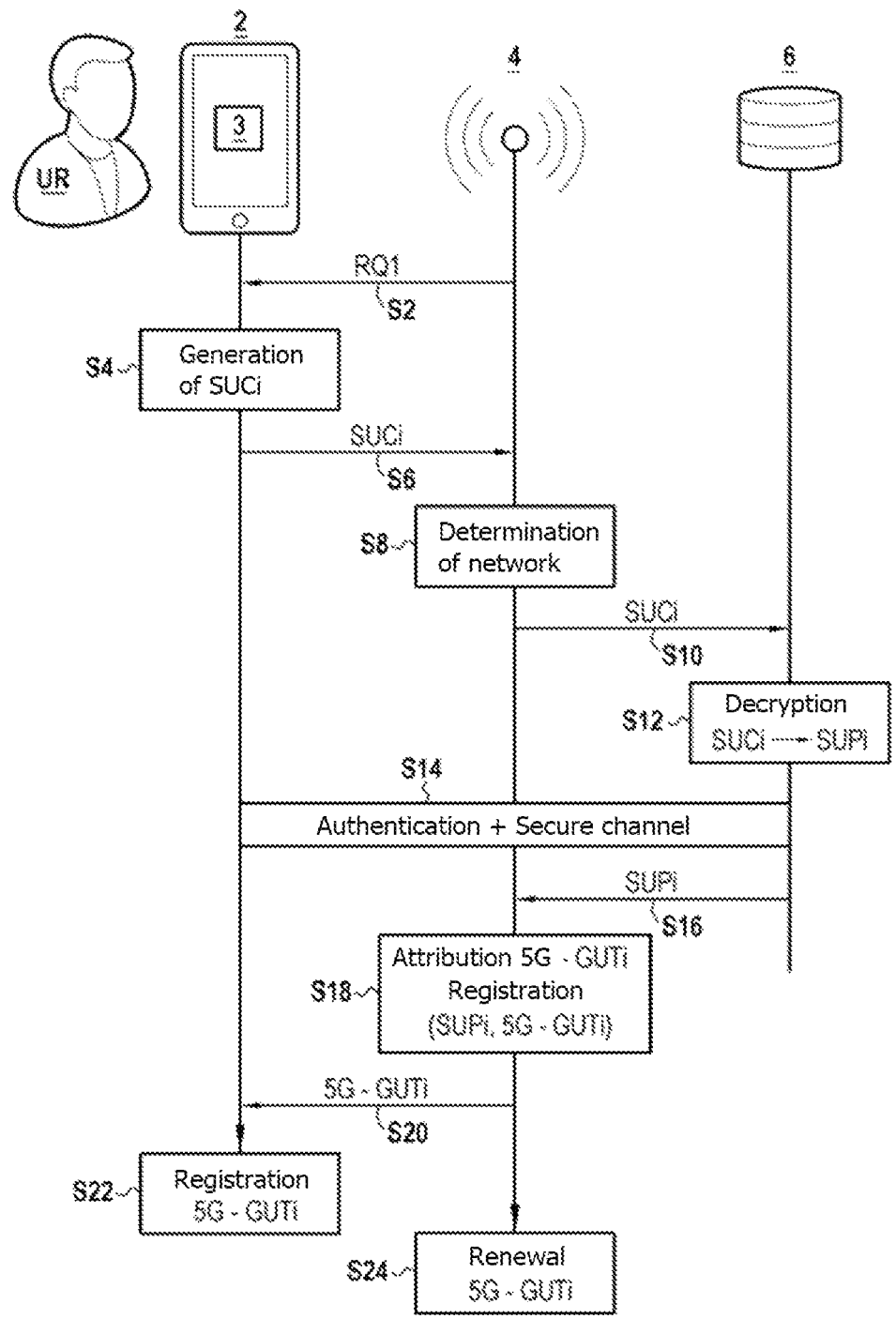
PRIOR ART

[Figure 2]
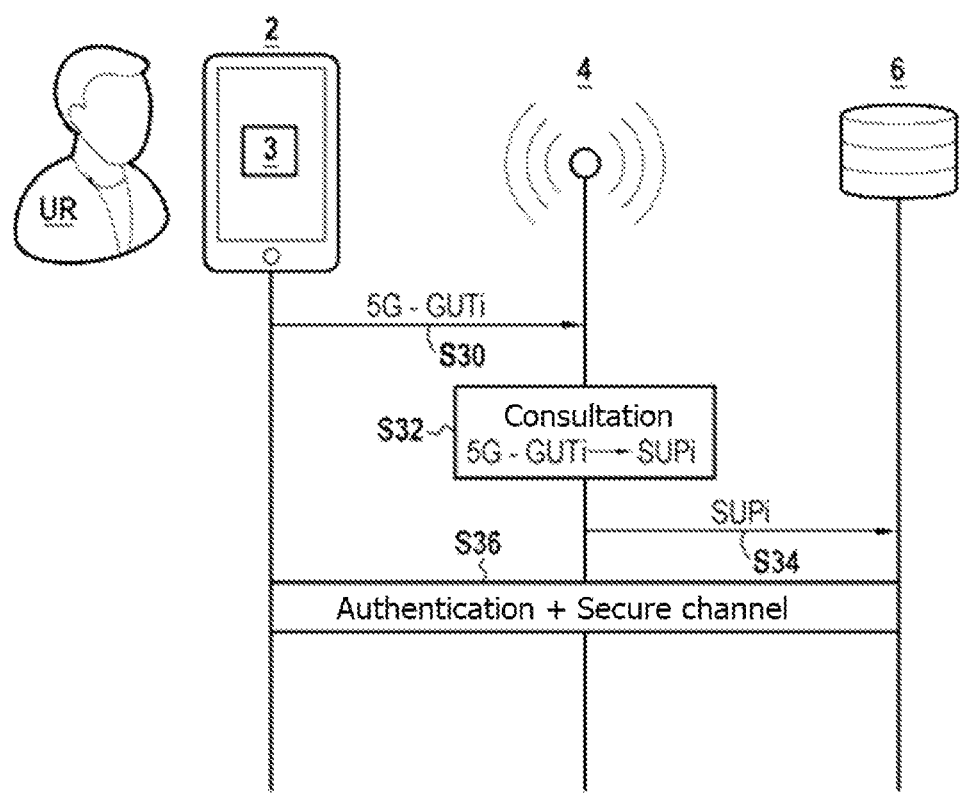
PRIOR ART

[Figure 3]
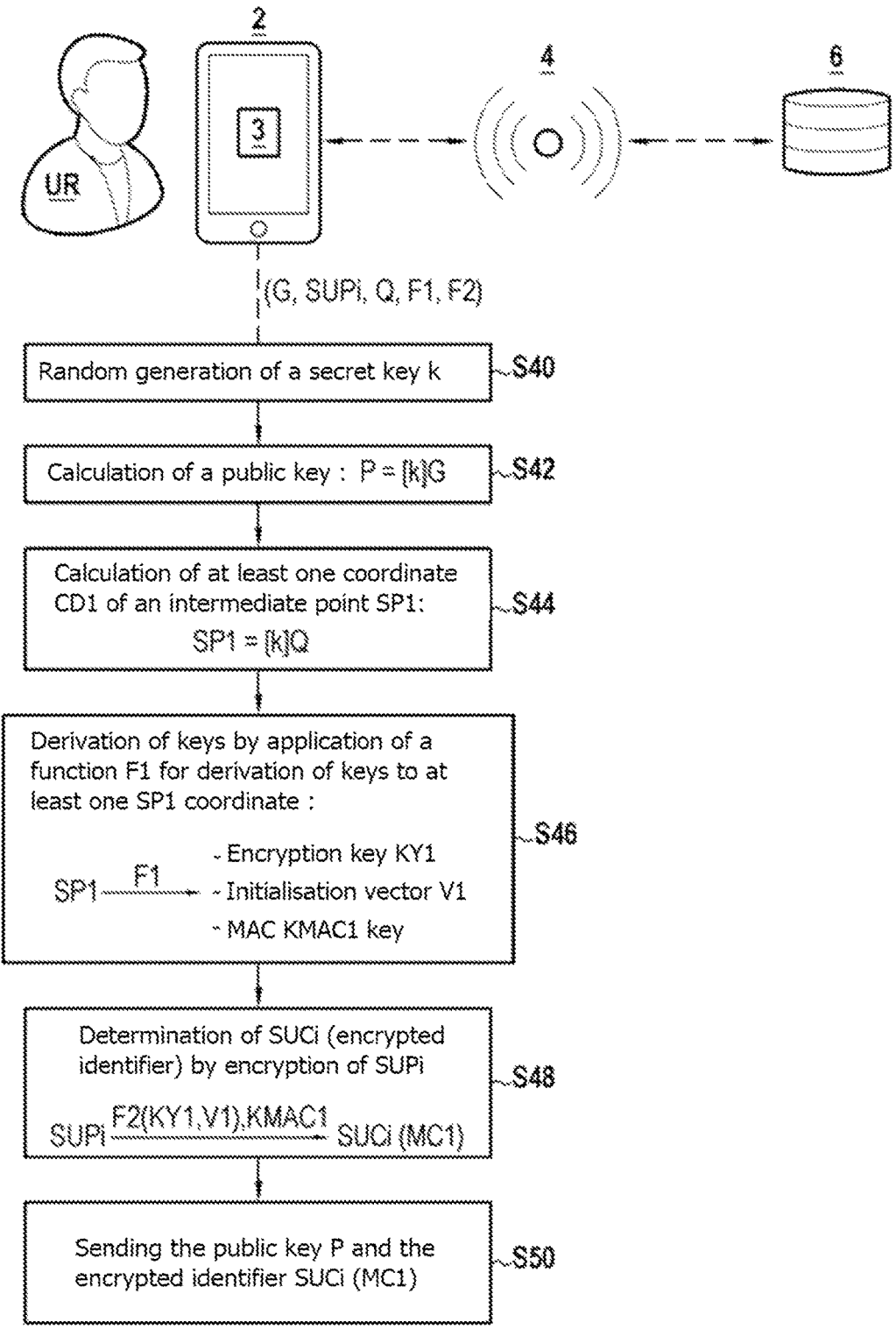

[Figure 4]
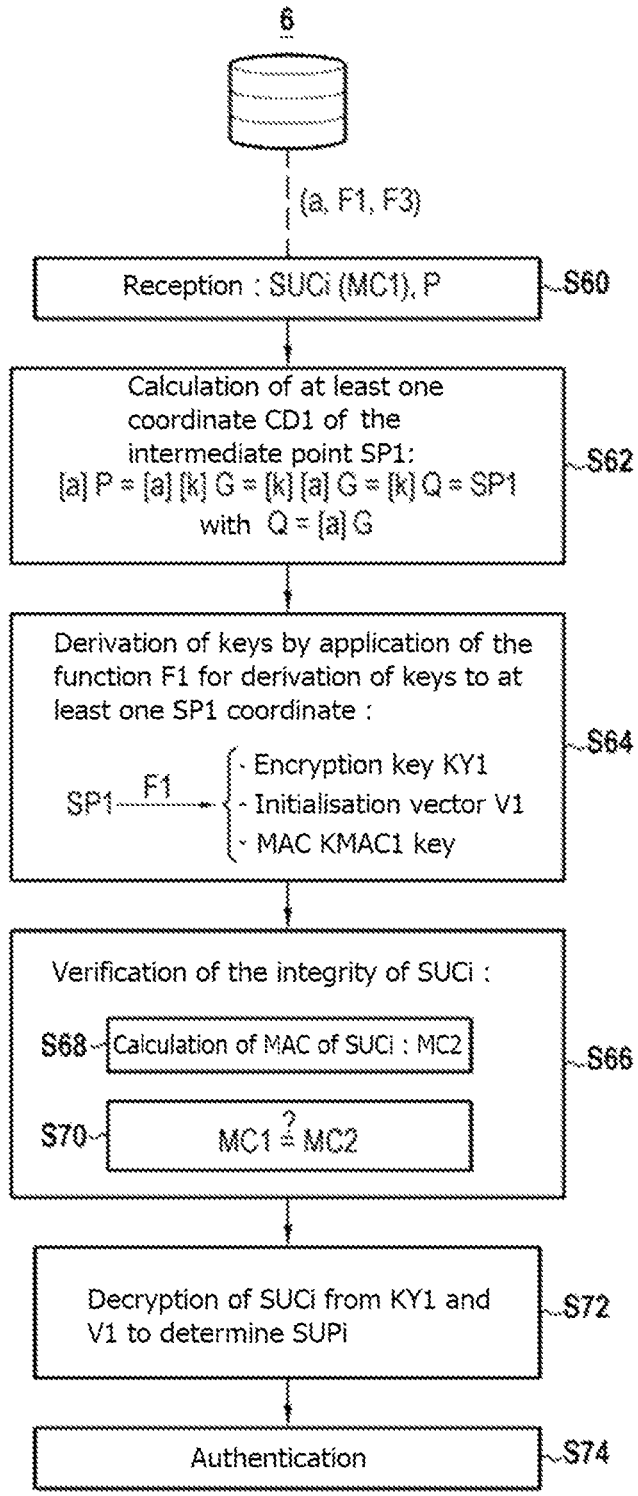

[Figure 5]
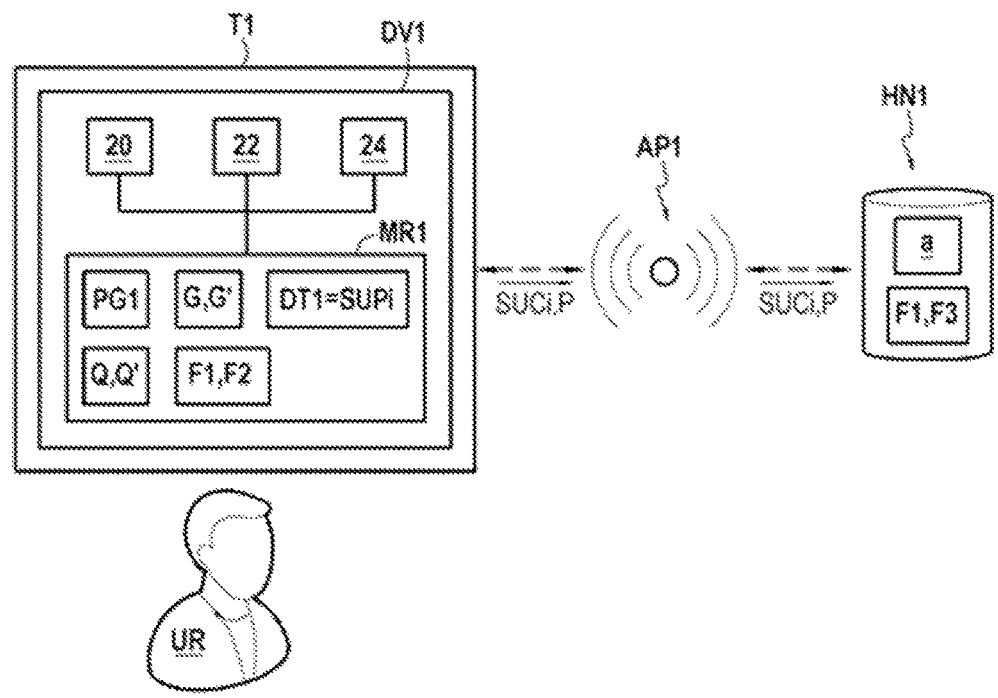

[Figure 6]
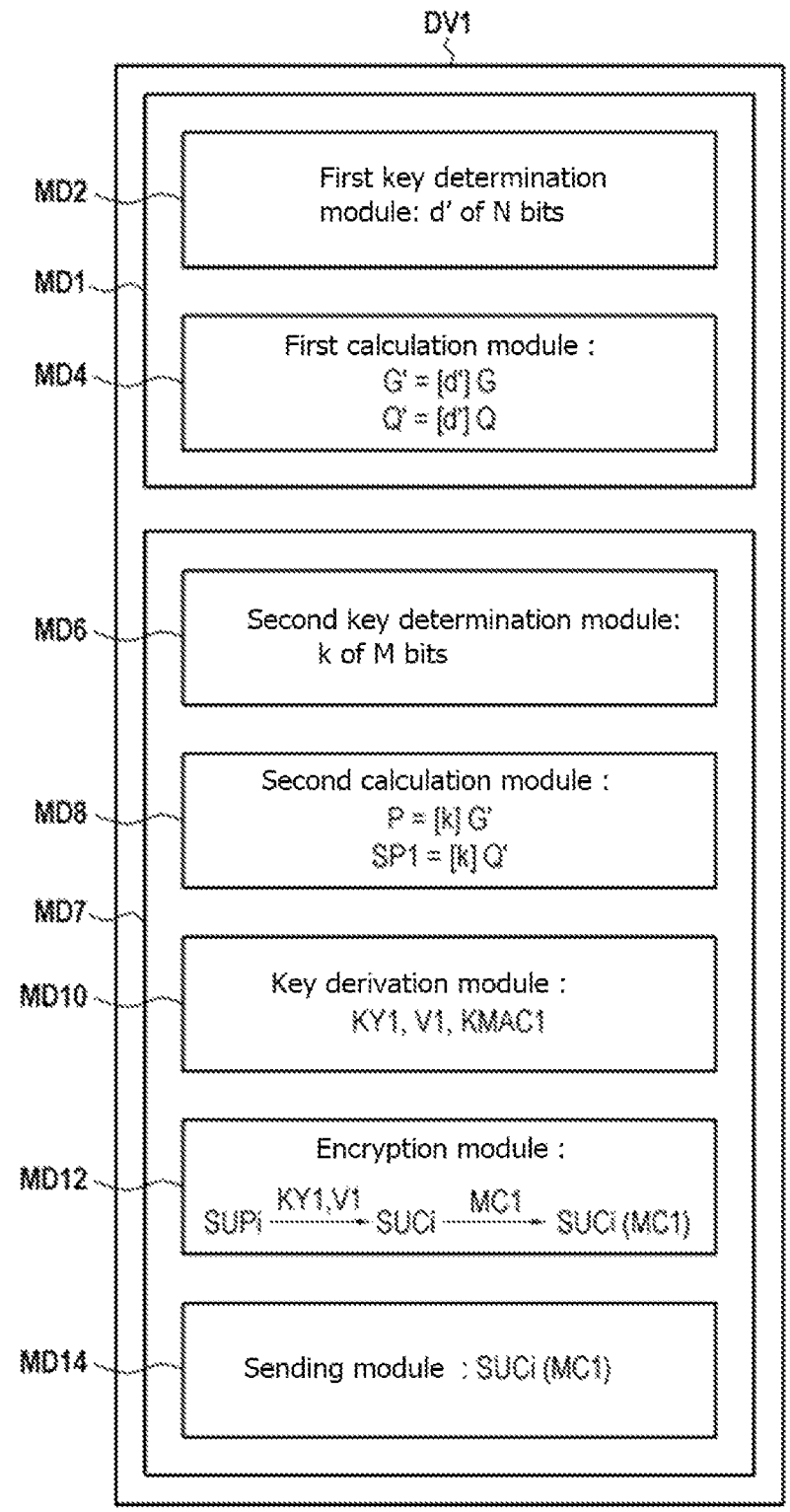

[Figure 7A]
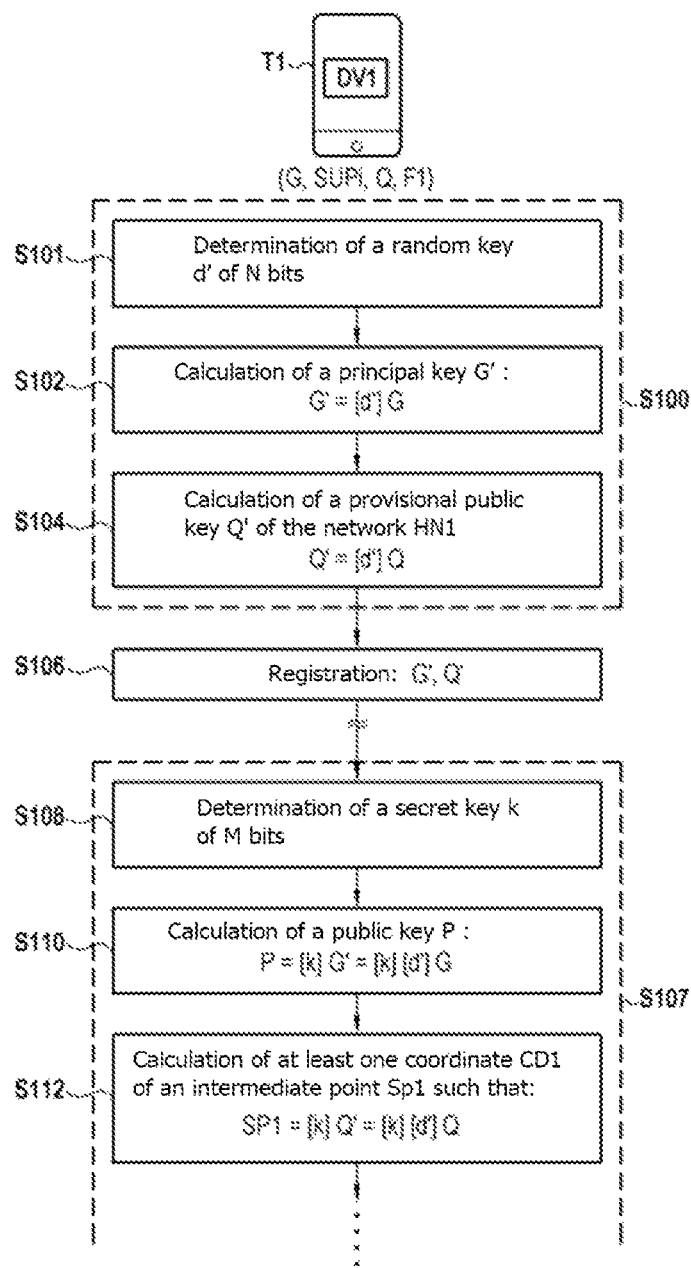

[Figure 7B]
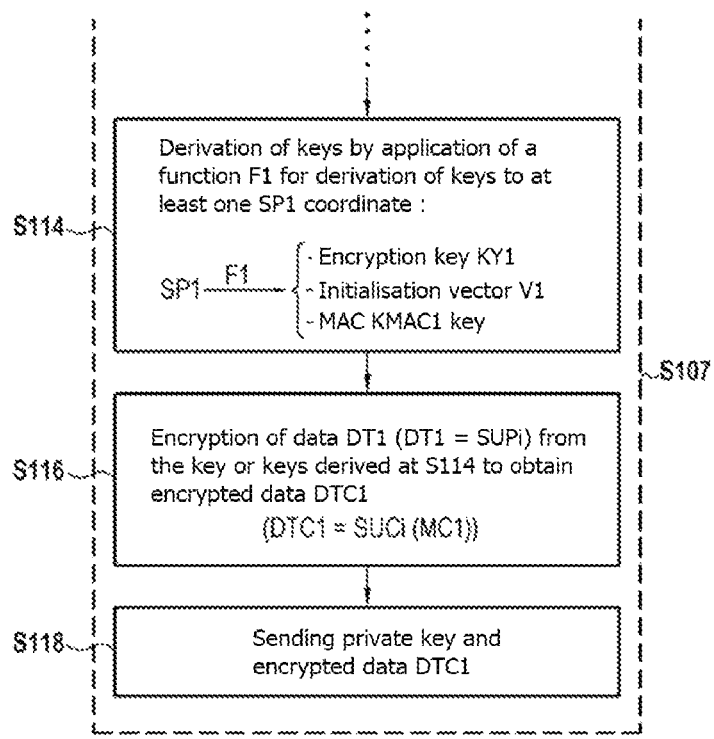
(Continued)

[Figure 8]
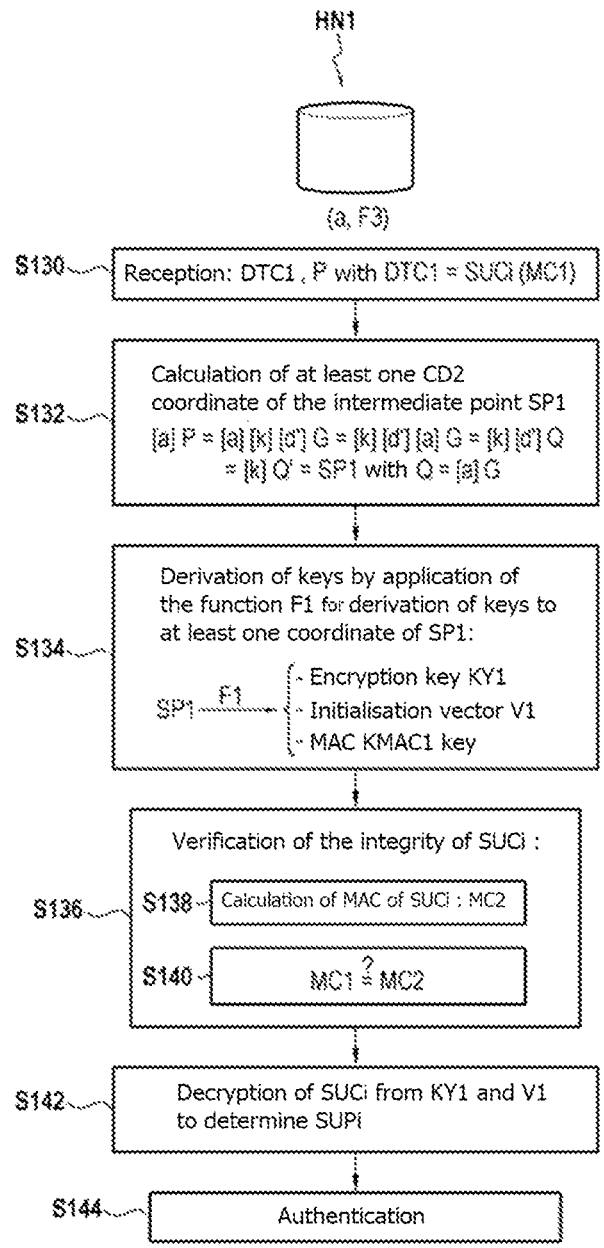

[Figure 9]
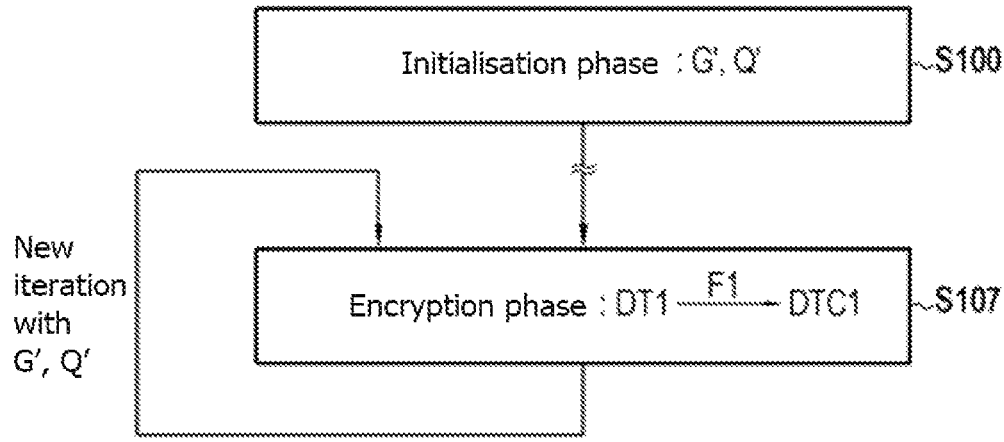
[Figure 10]
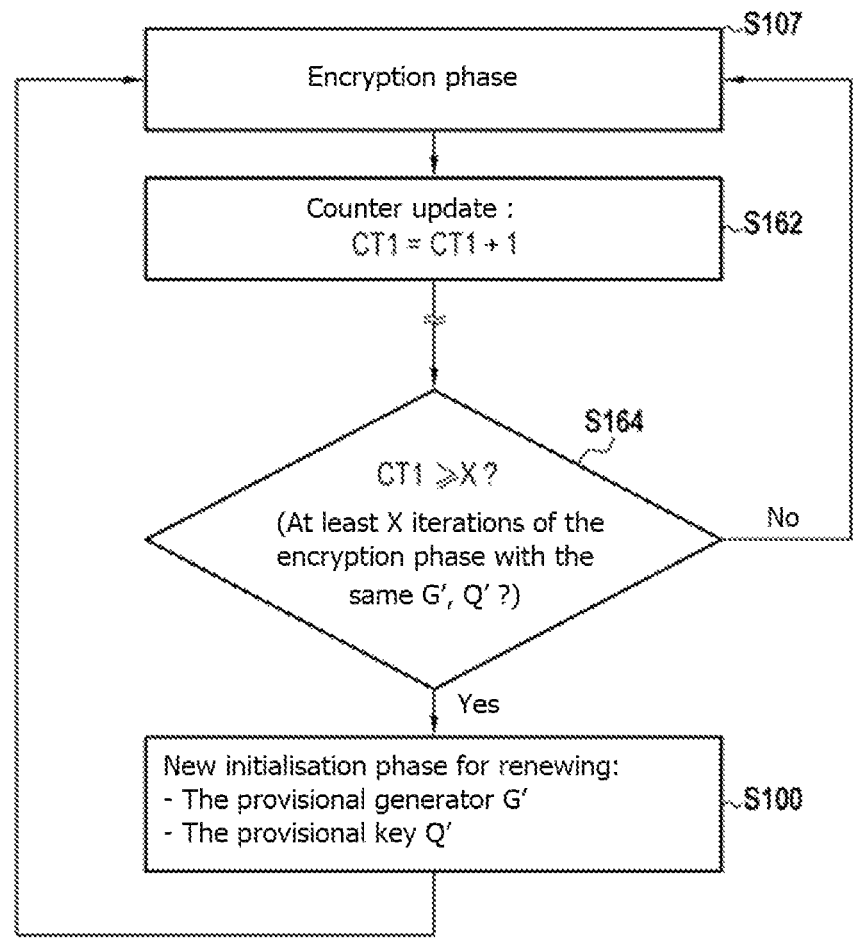

[Figure 11]
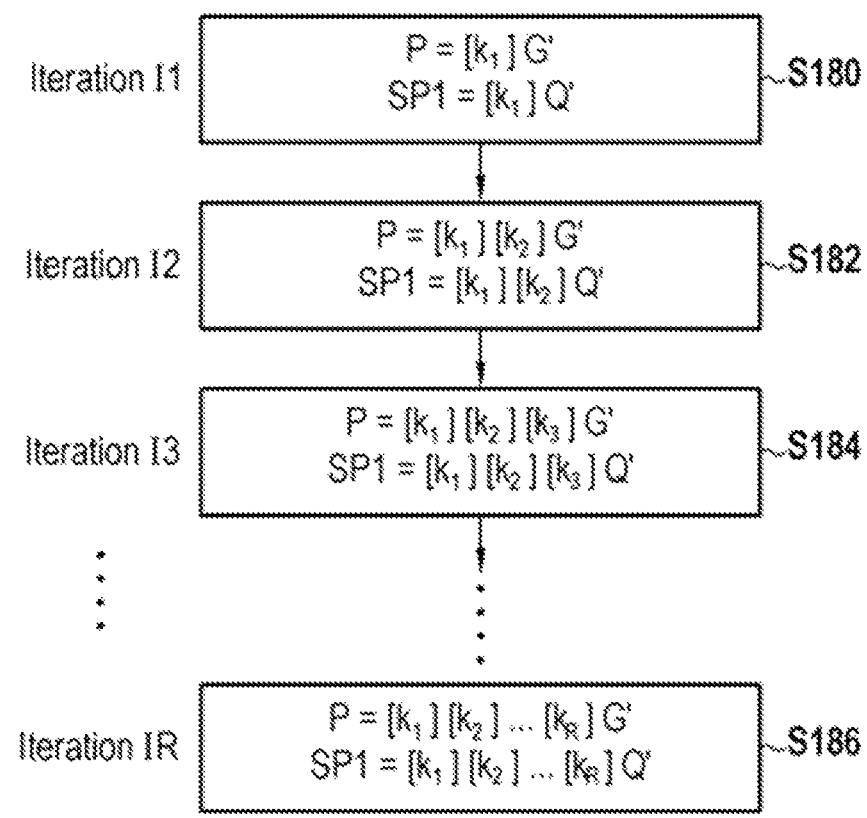

CRYPTOGRAPHIC PROCESSING EVENTS FOR ENCRYPTING OR DECRYPTING DATA

TECHNICAL FIELD

The present disclosure relates to the field of cryptography and relates more particularly to the execution of cryptographic processing events to encrypt data to be sent securely from a device to an external entity. The present disclosure relates especially to the encryption of an identifier of an embedded subscriber identity module, as well as transmission of such an identifier in encrypted form to authenticate a telecommunications terminal with a telecommunications network.

BACKGROUND

In telecommunications, "4G" refers to the fourth generation of standards for mobile telephony corresponding to LTE-Advanced (IMT-Advanced). 4G networks, comprising a network core based on IP have offered more efficient rates and services than what was possible in preceding 2G or 3G generations.

As is known, to access a mobile 4G network and utilise the associated services a telecommunications terminal ("smartphone" telephone or other) must send identification data to be authenticated with the network. To achieve this, a subscriber identity module (a SIM card for example) is generally embedded in the terminal so as to send an IMSI identifier (for "International Mobile Subscriber Identity") of the subscriber to the 4G network and complete an authentication procedure with the 4G network.

But security problems and risks of infringing private lives have been noticed in the context of 4G. In particular, the lack of security during transmission of the IMSI identifier from the terminal to this 4G network exposes the subscriber to the risk of interception of his IMSI identifier by malevolent third parties called "IMSI interceptor" or "IMSI catchers". By way of a monitoring system used to intercept mobile communications traffic a malevolent third party is in fact capable of remotely retrieving sensitive information (including the IMSI) or tracing the movements of users of 4G terminals. To achieve this, an IMSI interceptor simulates a false relay antenna by interposing it between the network of the telephone operator and the target client terminal.

The fifth generation—called 5G—of standards for mobile telephony is extending technological exploration LTE (for "Long Term Evolution") and offers even more effective rates and services. The 5G generation of telecommunications networks has now introduced measures for reinforcing security of the private life of users, and especially for combating the illegal interception of subscriber identifiers during authentication of terminals with 5G networks.

5G provides in particular cryptographic processing events which are implemented by the embedded subscriber identity modules (for example of SIM, "eSIM" card type for "embedded SIM", or others) to encrypt the identifiers (SUPI for "Subscription Permanent Identifier") of subscribers. SUPI identifiers are sent in encrypted form from the embedded subscriber identity modules to the associated 5G networks.

To achieve this, the embedded subscriber identity modules comprise means for cryptographic processing capable of generating an encrypted identifier known as "SUCI" (for "Subscription Concealed Identifier") from the SUPI identifier and from cryptographic keys. Providing of the encrypted SUCI identifier allows the terminal client to be authenticated securely with the network and receive a provisional identifier which is substituted for its encrypted identifier SUCI and allows it to be authenticated regularly with the network.

FIG. 1 schematically illustrates a telecommunications terminal 2 of a user UR, this terminal being capable of cooperating with a 5G mobile network (noted 6) via an access point 4 (or relay antenna, for example). In this example, the terminal utilises an embedded subscriber identity module 3 to generate (S4) an encrypted identifier SUCI in response to the receiving (S2) of a request RQ1 coming from the access point 4. The encrypted identifier SUCI is sent (S6) in a message MSG1 to the access point 4, the latter determining (S8) from the SUCI that the network 6 is the network associated with the subscriber UR. It should be noted that the access point 4 normally has no means necessary for decrypting the identifier SUCI itself.

The access point 4 sends (S10) the encrypted identifier SUCI (with other associated information) to the network 6 which then decrypts (S12) the encrypted identifier SUCI to deduce the SUPI identifier of the subscriber from it. The network 6 and the subscriber identity module 3 together carry out a procedure of mutual authentication and set up a secure channel (step S14). Once this step S14 is completed, the network 6 sends (S16) the SUPI identifier in its decrypted form to the access point 4. From the SUPI, the access point determines (S18) a provisional identifier called "5G-GUTI" which it logs along with the SUPI identifier of the subscriber UR. The access point 4 also sends (S20) the provisional identifier 5G-GUTI to the embedded subscriber identity module 3 which logs it (S22) locally.

After this, the embedded subscriber identity module 3 can be authenticated regularly with the network 6 by means of its provisional identifier 5G-GUTI which it sends to the access point 4. In this way, the user identifier SUPI is never communicated in decrypted form between the terminal 2 and the access point 4, which prevents all non-authorised interceptions of the SUPI by malevolent third parties monitoring communications. The access point 4 can also regularly renew (S24) the provisional identifier 5G-GUTI attributed to the embedded subscriber identity module 3 to limit risks of the terminal 2 being traced by a malevolent third party.

As illustrated in FIG. 2, the embedded subscriber identity module 3 can later again be authenticated by sending (S30) its current provisional identifier 5G-GUTI to the access point 4 which then consults its database to retrieve the associated SUPI identifier (S32). The access point 4 then sends (S34) the SUPI identifier retrieved from its database to the network 6. From the SUPI, the network 6 can now carry out a new procedure for authentication and setting up a secure channel (S36).

The measures described hereinabove have secured the subscriber SUPI identifier during authentication of client terminals with 5G networks, thereby limiting the risk of fraudulent interceptions by malevolent third parties. The personal data and the private life of users are therefore better protected.

But there is a problem in that the cryptographic processing events needed for encrypting the identifiers SUPI are very costly in resources and processing time, which degrades the performance of client terminals when accessing a 5G network and using associated services.

There is currently no satisfactory cryptographic solution for obtaining a good compromise between a high level of security for a subscriber identifier and effective access to a telecommunications network (rapid and secure authentication), whether in a 5G network or in any other type of telecommunications network. More generally, there is a need for effective cryptographic processing for encrypting or decrypting any data (whether this is a SUCI identifier or other data in another context) while offering a good compromise between level of encryption security and encryption performance (cost of resources, processing time, etc.).

SUMMARY

For this purpose, the present disclosure relates to a first cryptographic processing method executed by a first device which enables the encryption of data. More particularly, one embodiment of the present disclosure is a first cryptographic processing method executed by a device cooperating with a second system, said method comprising:

an initialisation phase comprising:
   determination of a provisional generator point G' equal to a first product such as G'=[d']G, where d' is a first random scalar forming a first secret key of N bits and G is a generator point of an elliptical curve; and
   determination of a provisional key Q' equal to a second product such as Q'=[d']Q, where Q is a point of the elliptical curve forming a public key associated with the second system; and an encryption phase comprising:
   determination of a second random scalar forming a second secret key k of M bits, with M<N;
   calculation of a public key P associated with the device, P being equal to a third product such as P=[k]G';
   calculation of at least one coordinate of an intermediate point SP1, of the elliptical curve, equal to a fourth product such as SP1=[k]Q';
   derivation of at least one key by application of a key derivation function to said at least one coordinate of the intermediate point SP1;
   encryption of data from said at least one key derived during said derivation so as to obtain encrypted data; and
   sending of the public key P and the encrypted data to the second system for decryption by the second system.

In embodiments, the first cryptographic processing is executed based on elliptical curves (for example of Diffie-Hellman type) which generates a shared secret (or common secret) to securely encrypt data by ensuring a good compromise between the level of security achieved and the cost required for resources and processing time. To achieve this, the generator point G and the public key Q used to calculate the public key P and the intermediate point SP1 respectively (or at least one coordinate of SP1) are replaced by a provisional generator point G' and a provisional key Q' respectively obtained during the initialisation phase, these parameters G' and Q' both depending on the same secret key d' coded on N bits.

A high level of security is ensured especially due to the use of a first secret key d', coded on a number N of bits, to determine the provisional generator point G' and the provisional public key Q'. The provisional generator point G' and the provisional public key Q' occur in the calculation of the public key P and the coordinate of the intermediate point SP1 during the encryption phase, reinforcing the security of these calculations. In this way, the values of the public key P and the coordinate depend not only on the second secret key k (coded on M bits) but also on the first secret key d' (coded on N bits).

Also, it is possible to limit the resources needed for the device to determine the public key P and the coordinate, or at least improve the management of these resources, by breaking down the calculations of these two elements into two phases. During the initialisation phase, the device can obtain the provisional generator point G' and/or the provisional key Q' from outside or determine it by calculation at an opportune time, for example upstream of the encryption phase, for example during a period of inactivity or at the very least when necessary resources are available. It is therefore possible to accelerate the speed of encryption of the data by determining in advance, during an initialisation phase, the provisional generator point G' and the provisional key Q' for immediate use when the encryption phase is triggered, irrespective of the data to be encrypted.

In embodiment, cryptographic calculations that are most expensive in terms of time and resources are performed during the initialisation phase prior to initiating the encryption phase. The first secret key d' being coded on more bits than the second secret key k, the initialisation phase concentrating the most expensive calculations. The calculation operations during the encryption phase are therefore less costly to the extent where k occurring in the third and fourth products is lower in resolution.

According to an embodiment, during the initialisation phase the provisional generator point G' and the provisional key Q' are received from outside the device. The provisional generator point G' and the provisional key Q' can be registered by the device, for example in a non-volatile memory of the device so they can be retrieved and used later during the encryption phase. According to this embodiment, the device therefore does not need to calculate the generator point G' and the provisional key Q'.

According to a particular example, the method comprises a step for obtaining data to be encrypted (prior to the encryption step of said data). These data can be received or determined in any way. According to a particular example, determination of the secret key k, calculation of the public key P and calculation of at least one coordinate of an intermediate point SP1, or even said derivation of at least one key, are executed in advance, that is, prior to the step for obtaining data to be encrypted.

According to an embodiment, the public key P allows the second system to recalculate said at least one coordinate of the intermediate point SP1 from a scalar forming a secret key—noted a—of the second system, where SP1=[a]P, and
   wherein said at least one coordinate of the intermediate point SP1 allows the second system to decrypt the encrypted data.

According to an embodiment, N=256 bits and M=32 bits, 48 bits, 64 bits or 128 bits.

According to an embodiment, the initialisation phase comprises:
   determination of the first random scalar forming said first secret key d' of N bits;
   calculation of the provisional generator point G' equal to the first product such as G'=[d']G; and
   calculation of the provisional key Q' equal to the second product such as Q'=[d']Q.

According to an embodiment, following the initialisation phase, the method comprises registering of the provisional generator G' and of the provisional key Q' in a non-volatile memory of said device.

According to an embodiment, the encryption phase is triggered on detection of at least one event, said initialisation phase being performed prior to said detection.

According to an embodiment, during said derivation of at least one key, the application of the key derivation function to said at least one coordinate of the intermediate point SP1 produces an encryption key, an initialisation vector and a MAC key;

wherein said encryption comprises:

application of an encryption function to encrypt said data from the encryption key and the initialisation vector; and calculation of an authentication code MAC from the encrypted data and the MAC key;

wherein, apart from the public key P and the encrypted data, the device sends the authentication code MAC (MC1) to the second system to allow the second system to verify the integrity of the encrypted data.

According to an embodiment, the device executes at least two successive iterations of the encryption phase, from said provisional generator point G' and said provisional key Q' determined during the initialisation phase, to encrypt data which are sent to the second system for decryption.

In other terms, it is possible to carry out a plurality of iterations of the encryption phase by using the same provisional generator point G' and the same provisional key Q' determined during the initialisation phase, which further reduces costs required for resources and processing time to execute data encryption. Embodiments accordingly accelerate the processing executed by the device even more, since it is unnecessary to perform the initialisation phase prior to each encryption phase.

According to an embodiment, for at least one iteration of the encryption phase the provisional generator G' and the provisional key Q' used during the current iteration are equal respectively to the public key P and to the intermediate point SP1 which have been calculated during the preceding iteration of the encryption phase.

According to an embodiment, on detection that, from said provisional generator point G' and said provisional key Q' determined during the initialisation phase, the device has carried out at least X successive iterations of the encryption phase to send encrypted data to the second system, X being an integer such that X≥1, the method also comprises:

execution of a new iteration of the initialisation phase to renew the provisional generator G' and the provisional key Q' from a new first secret random key d' different to the first random key determined during the preceding iteration of the initialisation phase;

the renewed provisional generator G' and the renewed provisional key Q' being used during at least one later iteration of the encryption phase to send new encrypted data to the second system.

The device can accordingly renew the parameters G' and Q' periodically to reinforce security while upholding good processing performance, for example for authenticating the device with the network several times. In particular, regular renewal of the parameters G' and Q' (and therefore of the first secret key d') prevents a malevolent third party from tracing the device over time when the latter is being registered as embedded subscriber identity module with a telecommunications network. It is in fact difficult for a third party to trace a user based on the public keys P exchanged during various iterations of the encryption phase or of the method, as these keys are not differentiated solely by the secret key k but by this secret key k and by the provisional generator point G'.

According to an embodiment, the first method is such that:

the second system is a telecommunications network;

the device is an embedded subscriber identity module of a terminal for authenticating said terminal with the telecommunications network;

the data comprise an identifier of the embedded subscriber identity module;

during said encryption, the identifier is encrypted based on said at least one key derived during said derivation so as to obtain an encrypted identifier; and during said sending, the public key P and the encrypted identifier are sent to an access point of the telecommunications network to allow said embedded subscriber identity module to be authenticated with said telecommunications network.

According to an embodiment, the encryption phase is triggered on detection of at least one event, said initialisation phase being performed prior to said detection, said at least one event comprising the receiving, from the access point of the telecommunications network, of a request for registering of the embedded subscriber identity module with said telecommunications network.

According to an embodiment, the telecommunications network is a 5G mobile network and the identifier of the embedded subscriber identity module is a SUPI identifier.

Embodiments particularly improve the cryptographic processing events carried out by an embedded subscriber identity module to encrypt the SUPI identifier of a subscriber, and also ensures a good compromise between the level of security achieved and the required cost of resources and processing time.

In a particular embodiment, the different steps of the first cryptographic processing method are determined by computer program instructions.

As a consequence, another embodiment of the present disclosure is also a computer program on a data carrier (or recording medium), this program being likely to be run in a cryptographic processing device or more generally in a computer (or any device comprising a processor, such as an embedded subscriber identity module for example), this program comprising instructions adapted to performing the steps of a first cryptographic processing method such as defined in this document.

Another embodiment of the present disclosure is a recording medium (or data carrier) legible by a computer, and comprising instructions of a computer program such as mentioned hereinabove.

Another embodiment of the present disclosure is a corresponding first cryptographic processing device configured to execute the first cryptographic processing method of the present disclosure.

The present disclosure relates particularly to a cryptographic processing device capable of cooperating with a second system, comprising:

an initialisation module configured to execute an initialisation phase comprising:

determination of a provisional generator point G' equal to a first product such as G'=[d']G, where d' is a first random scalar forming a first secret key of N bits and G is a generator point of an elliptical curve; and determination of a provisional key Q' equal to a second product such as Q'=[d']Q, where Q is a point of the elliptical curve forming a public key associated with the second system; and an encryption module configured to execute an encryption phase comprising:

determination of a second random scalar forming a second secret key k of M bits, with M<N;

calculation of a public key P associated with the device, P being equal to a third product such as P=[k]G';

calculation of at least one coordinate of an intermediate point SP1, of the elliptical curve, equal to a fourth product such as SP1=[k]Q';

derivation of at least one key by application of a key derivation function to said at least one coordinate of the intermediate point SP1;

encryption of data based on said at least one key derived during said derivation so as to obtain encrypted data; and sending to the second system of the public key P and the encrypted data for decryption by the second system.

According to a particular embodiment, the first device comprises a memory configured to store the provisional generator G' and the provisional key Q' determined by the initialisation module.

It should be noted that the different embodiments mentioned earlier (as well as those described hereinbelow) in relation to the first cryptographic processing method of the present disclosure as well as the associated advantages apply similarly to the first cryptographic processing device of the present disclosure.

For each step of the first cryptographic processing method, the first cryptographic processing device of the present disclosure can comprise a corresponding module configured to execute said step.

Embodiments also apply similarly to the decryption of encrypted data. An embodiment of the present disclosure in particular is a second cryptographic processing method carried out by a second cryptographic processing device which allows decryption of encrypted data on the basis of a principle similar to the first method defined earlier (and described hereinbelow).

A particular embodiment of the present disclosure is a second cryptographic processing method executed by a device cooperating with a second system, said process comprising:

an initialisation phase comprising:
  determination of a provisional generator point G' equal to a first product such as G'=[d']G, where d' is a first random scalar forming a first secret key of N bits and G is a generator point of an elliptical curve; and
  determination of a provisional key Q' equal to a second product such as Q'=[d']Q, where Q is a point of the elliptical curve forming a public key associated with the second system; and a decryption phase comprising:
  determination of a second random scalar forming a second secret key k of M bits, with M<N;
  calculation of a public key P associated with the device, P being equal to a third product such as P=[k]G';
  sending of the public key P to a second system;
  receiving of encrypted data originating from the second system;
  calculation of at least one coordinate of an intermediate point SP1, of the elliptical curve, equal to a fourth product such as SP1=[k]Q';
  derivation of at least one key by application of a key derivation function to said at least one coordinate of the intermediate point SP1; and
  decryption of the encrypted data based on said at least one key derived during said derivation so as to obtain decrypted data.

It should be noted that the different embodiments mentioned earlier (as well as those described hereinbelow) in relation to the first cryptographic processing method of the present disclosure as well as the advantages associated apply similarly to the second cryptographic processing method of the present disclosure.

More specifically, according to an embodiment, during the initialisation phase the provisional generator point G' and the provisional key Q' are received from outside the device. The provisional generator point G' and the provisional key Q' can also be registered by the device, in a non-volatile memory of the device for example, so they can be retrieved and used later during the encryption phase. According to this embodiment, the device therefore does not need to calculate the generator point G' and the provisional key Q'.

According to a particular example, calculation of at least one coordinate of an intermediate point SP1, or even said derivation of at least one key, are executed in advance, that is, prior to the step for receiving encrypted data.

According to a particular embodiment, the public key P allows the second system to calculate said at least one coordinate of the intermediate point SP1 based on a scalar forming a secret key—noted a—of the second system, where SP1=[a]P, and wherein said at least one coordinate of the intermediate point SP1 allows the second system to encrypt data so as to obtain the encrypted data.

According to a particular embodiment, N=256 bits and M=32 bits, 48 bits, 64 bits or 128 bits.

According to a particular embodiment, the initialisation phase comprises:
  determination of the first random scalar forming said first secret key d' of N bits;
  calculation of the provisional generator point G' equal to the first product such as G'=[d']G; and
  calculation of the provisional key Q' equal to the second product such as Q'=[d']Q.

According to a particular embodiment, following the initialisation phase, the method comprises registering of the provisional generator G' and of the provisional key Q' in a non-volatile memory of the device.

According to a particular embodiment, the decryption phase is triggered on detection of at least one event, said initialisation phase being performed prior to said detection.

According to a particular embodiment, during said derivation of at least one key, the application of the key derivation function to said at least one coordinate of the intermediate point SP1 produces a decryption key, an initialisation vector and a MAC key;

in which said decryption comprises:
  application of a decryption function to decrypt said encrypted data based on the decryption key and the initialisation vector; and
  calculation of an authentication code MAC based on the encrypted data and the MAC key to verify the integrity of the encrypted data received.

According to a particular embodiment, the device performs at least two successive iterations of the decryption phase, based on said provisional generator point G' and said provisional key Q' determined during the initialisation phase, to decrypt said encrypted data received from said second system.

According to a particular embodiment, for at least one iteration of the decryption phase the provisional generator G' and the provisional key Q' used during the current iteration are equal respectively to the public key P and to the intermediate point SP1 which have been calculated during the preceding iteration of the decryption phase.

According to a particular embodiment, on detection from said provisional generator point G' and said provisional key Q' determined during the initialisation phase that the device has carried out at least X successive iterations of the decryption phase to decrypt encrypted data received from the second system, X being an integer such that X≥1, the method also comprises:

execution of a new iteration of the initialisation phase to renew the provisional generator G' and the provisional key Q' based on a new first secret random key d' different to the first random key determined during the preceding iteration of the initialisation phase;

the renewed provisional generator G' and the renewed provisional key Q' being used during at least one later iteration of the decryption phase to decrypt new encrypted data received from the second system.

As a consequence, another embodiment of the present disclosure is a computer program on a data carrier (or recording medium), this program being likely to be executed in a cryptographic processing device or more generally in a computer (or any device comprising a processor, such as an embedded subscriber identity module for example), this program comprising instructions adapted to perform the steps of a second cryptographic processing method such as defined in this document.

Another embodiment of the present disclosure is a recording medium (or data carrier) legible by a computer and comprising computer program instructions such as mentioned hereinabove.

It should be noted that the computer programs mentioned in the present presentation can use any programming language and be in the form of source code, object code, or intermediate code between source code and object code, such as in a partially compiled form, or in any other preferred form.

Another embodiment of the present disclosure is a data carrier (or recording medium) legible by an embedded subscriber identity module and more generally by a computer and comprising computer program instructions such as defined in this document.

Also, the registering media mentioned in the present presentation can be any entity or device capable of storing the program. For example, the medium can comprise storage means such as a rewritable non-volatile memory or ROM, for example a CD ROM or a ROM of microelectronic circuit, or even magnetic registering means, for example a disk (floppy disc) or a hard drive.

On the other hand, the data carrier can be a transmissible medium such as an electric or optical signal which can be conveyed via an electric or optical cable, by radio or by other means. The program according to the present disclosure can be downloaded over a network of Internet type in particular.

Alternatively, the data carrier can be an integrated circuit in which the program is incorporated, the circuit being adapted for executing or to be used in the execution of the method in question.

Another embodiment of the present present disclosure is a second cryptographic processing corresponding device configured to execute the second cryptographic processing method of the present disclosure.

The present disclosure relates in particular to a cryptographic processing device capable of cooperating with a second system, comprising:

an initialisation module configured to execute an initialisation phase comprising:

determination of a provisional generator point G' equal to a first product such as $G'=[d']G$, where d' is a first random scalar forming a first secret key of N bits and G is a generator point of an elliptical curve; and determination of a provisional key Q' equal to a second product such as $Q'=[d']Q$, where Q is a point of the elliptical curve forming a public key associated with the second system; and a decryption module configured to execute a decryption phase comprising:

determination of a second random scalar forming a second secret key k of M bits, with M<N;

calculation of a public key P associated with the device, P being equal to a third product such as $P=[k]G'$;

sending of the public key P to a second system;

receiving of encrypted data originating from the second system;

calculation of at least one coordinate of an intermediate point SP1, of the elliptical curve, equal to a fourth product such as $SP1=[k]Q'$;

derivation of at least one key by application of a key derivation function to said at least one coordinate of the intermediate point SP1; and decryption of the encrypted data based on said at least one key derived during said derivation so as to obtain decrypted data.

According to a particular embodiment, the second device comprises a memory configured to store the provisional generator G' and the provisional key Q' determined by the initialisation module.

It should be noted that the different embodiments mentioned earlier (as well as those described hereinbelow) in relation to the second cryptographic processing method of the present disclosure as well as the associated advantages apply similarly to the second cryptographic processing device of the present disclosure.

For each step of the second cryptographic processing method, the second cryptographic processing device of the present disclosure can comprise a corresponding module configured to execute said step.

Embodiments may be executed by means of software and/or hardware components. From this standpoint the term "module" can correspond in this document both to a software component and to a hardware component or to a set of hardware and software components.

A software component corresponds to one or more computer programs, one or more sub-programs of a program, or more generally to any element of a program or software capable of executing a function or a set of functions, according to which is described hereinbelow for the module in question. In the same way, a hardware component corresponds to any element of a hardware assembly (or hardware) capable of carrying out a function or a set of functions, according to what is described in this document for the module in question. It can be a programmable hardware component or have an integrated processor for the execution of software, for example an integrated circuit, a smart card, a memory card, an electronic board for execution of firmware, etc.

BRIEF DESCRIPTION OF THE DRAWINGS

Other characteristics and advantages of the present disclosure will emerge from the following description in reference to the appended drawings which illustrate embodiments devoid of any limiting character, in which:

FIG. 1 is a diagram schematically illustrating a conventional authentication process of a telecommunications terminal with a 5G network;

FIG. 2 is a diagram schematically illustrating a conventional renewal process of the authentication of a telecommunications terminal with a 5G network;

FIG. 3 illustrates, in the form of a diagram, the steps of an encryption method of a subscriber identifier to authenticate with a 5G network;

FIG. 4 illustrates, in the form of a diagram, the steps of a decryption method of a subscriber identifier executed by a 5G network;

FIG. 5 illustrates a cryptographic processing device for authenticating the user telecommunications terminal with a telecommunications network, in keeping with a particular embodiment of the present disclosure;

FIG. 6 illustrates functional modules executed by a cryptographic processing device, according to a particular embodiment of the present disclosure;

FIGS. 7A-B illustrate, in the form of a diagram, the steps of a cryptographic method performed by a cryptographic processing device, according to a particular embodiment of the present disclosure;

FIG. 8 illustrates, in the form of a diagram, the steps of a cryptographic method performed by a telecommunications network, according to a particular embodiment of the present disclosure;

FIG. 9 illustrates, in the form of a diagram, the steps of a cryptographic method performed by a cryptographic processing device, according to a particular embodiment of the present disclosure;

FIG. 10 illustrates, in the form of a diagram, the steps of a cryptographic method performed by a cryptographic processing device, according to a particular embodiment of the present disclosure; and FIG. 11 illustrates, in the form of a diagram, the steps of a cryptographic method performed by a cryptographic processing device, according to a particular embodiment of the present disclosure.

DESCRIPTION OF EMBODIMENTS

The present disclosure proposes executing cryptographic processing events to encrypt or decrypt data and also ensure a good compromise between level of security and processing costs. One aspect of the present disclosure especially, but not exclusively, is to encrypt subscriber identifiers for authenticating a user with a telecommunications network (for example to encrypt a SUPI identifier in light of being authenticated with a 5G network). But embodiments of the present disclosure more generally encrypts or decrypts any data, whether they are subscriber identifiers to telecommunications networks or any other appropriate data.

In particular, embodiments set up a common secret (or shared secret) in light of either sending encrypted data from a device to a third-party entity, or decrypting encrypted data received in encrypted form.

One embodiment provides a cryptographic processing method executed by a cryptographic processing device (also known as "device" or "processing device" later on). This process comprises an initialisation phase during which the device determines a provisional generator point G' of an elliptical curve and a provisional key Q', and an encryption phase during which the device determines a public key P based on the generator point G' and encrypts data based on the provisional key Q'.

The device can therefore send the encrypted data as well as the public key P to a system, called "second system".

According to its different embodiments the present disclosure provides more particularly a cryptographic processing method executed by a device cooperating with a second system, said method comprising:

an initialisation phase comprising:
determination of a provisional generator point G' equal to a first product such as G'=[d']G, where d' is a first random scalar forming a first secret key of N bits and G is a generator point of an elliptical curve; and
determination of a provisional key Q' equal to a second product such as Q'=[d']Q, where Q is a point of the elliptical curve forming a public key associated with the second system; and an encryption phase comprising:
determination of a second random scalar forming a second secret key k of M bits, with M<N;
calculation of a public key P associated with the device, P being equal to a third product such as P=[k]G';
calculation of at least one coordinate of an intermediate point SP1 of the elliptical curve, this intermediate point SP1 being equal to a fourth product such as SP1=[k]Q';
derivation of at least one key by application of a key derivation function to said at least one coordinate of the intermediate point SP1;
encryption of data based on said at least one key derived during said derivation so as to obtain encrypted data; and
sending of the public key P and encrypted data to the second system for decryption by the second system.

Another embodiment of the present disclosure is a corresponding device and a corresponding computer program.

Another embodiment of the present disclosure is a method for decrypting encrypted data, which is based on a principle similar to that of the cryptographic processing method of the present disclosure. Another embodiment of the present disclosure is a corresponding device and a corresponding computer program.

Other aspects and advantages of the present disclosure will emerge from the embodiments described hereinbelow in reference to the drawings mentioned earlier.

In this document, exemplary embodiments of the present disclosure are described in the context of an embedded subscriber identity module configured to authenticate the user of a telecommunications terminal with a telecommunications network of 5G type. To achieve this, the embedded subscriber identity module (for example a SIM card or an eSIM module) executes cryptographic processing to encrypt a SUPI identifier of a user.

A SUPI identifier can be in the form of a chain of decimal digits (of 15 digits for example), various implementations being possible, however. According to a particular example, a SUPI identifier comprises successively:
3 digits representing the "Mobile Country Code" (MCC);
2 or 3 other digits forming the "Mobile Network Code" (MNC) identifying the operator network;
the remaining digits (9 or 10) forming an identifier MSIN (for "Subscriber Identification Number") which represents the user of the operator network.

It should be noted however that the present disclosure is not limited to this particular example and applies more generally to the encryption or decryption of any data by a cryptographic processing device of the present disclosure. The data to be encrypted (or to be decrypted) can be or comprise an identifier of a subscriber to a telecommunications network (of type 5G or other) or any other data such as personal data or data of sensitive character for example. The present disclosure also applies to the encryption or decryption of data in contexts other than that of authentication with a telecommunications network.

It should be noted that a subscriber identity module embedded in a telecommunications terminal can take several forms, and in particular various factors of form (formats). In this way, an embedded subscriber identity module can be in the form of a SIM card (or UICC for "Universal Integrated Circuit Card") or an eSIM card, also called eUICC. Another example of secure element is a secure embedded element called eSE (for "embedded Secure Element), which is generally soldered to the host terminal. Embodiments of the present disclosure are therefore applicable to different types of secure elements (for example, SIM, eSIM card, eUICC, SE, eSE or a combination of secure elements).

Unless otherwise expressed, the common elements or those similar to several figures bear the same reference numerals and present identical or similar characteristics, such that these common elements are generally not described again for simplicity.

For clearer understanding of the present disclosure described hereinbelow, an encryption method of a SUPI identifier and a decryption method of an identifier SUCI are described below in reference to FIGS. 3 and 4, according to a particular example not implementing embodiments of the present disclosure. These particular examples are registered in the authentication of a subscriber with a 5G network.

More precisely, as illustrated in FIG. 3, it is assumed that a telecommunications terminal 2 embeds a subscriber identity module 3 for example taking the form of a SIM card. This SIM 3 card especially authenticates the user UR with a telecommunications 5G network noted 6, via an access point 4 of said network. To achieve this, the SIM 3 card comprises means for carrying out operations of cryptographic processing events based on an elliptical curve E selected case by case by the skilled person. The SIM 3 card comprises in memory especially a generator point G of the elliptical curve E, a public key Q of the network 6, a SUPI identifier, a key derivation function F1 and an encryption function F2.

During a generation step S40, the SIM 3 card randomly generates a scalar forming a secret key k. It is assumed that this key k is coded on M bits, where M is equal to 256. The SIM 3 card then calculates (S42) a public key P which is associated with it based on the secret key k and the generator point G. To achieve this, the SIM 3 card calculates (S42) the product of k with G such that:

$$P=[k]G$$

It should be noted that throughout the present document this notation indicates a product (or multiplication) of a point of the elliptical curve (shown without hook) by a scalar (shown between "[ ]"). According to an equivalent notation (interchangeable throughout the present document), the public key P is therefore also such that:

$$P=k \cdot G$$

The SIM 3 card then calculates (S44) at least one coordinate CD1 (coordinate in the direction x and/or in the direction y for example) of a point SP1—called intermediate point—of the elliptical curve ε. This intermediate point SP1 is equal to the product of the secret key k by the public key Q of the network 6:

$$SP1=[k]Q$$

It is assumed that in this example the SIM 3 card determines only a single coordinate CD1 (for example along x or y) of the intermediate point SP1.

During a step S46, the SIM 3 card derives therefore the keys (or parameters) by applying the key derivation function F1 to the coordinate CD1 of the intermediate point SP1. In this example, the SIM 3 card thus derives an encryption key KY1, an initialisation vector V1 and optionally also a MAC key ("message authentication code") noted KMAC1.

By way of example, the function F1 can be the derivation function provided in the standard "ANSI X9.63 Key Derivation Function, § 5.6.3", with other functions being possible.

The SIM 3 card then ciphers or encrypts (S48) the SUPI identifier based on the keys (or data) obtained during derivation step S46 so as to obtain an encrypted identifier SUCI, which equals the SUPI identifier in an encrypted form. More precisely, the SIM 3 card determines the encrypted identifier SUCI by encrypting the subscriber SUPI identifier (or a sub-part of the subscriber SUPI identifier). To achieve this, the SIM 3 card applies an encryption function F2 to the SUPI identifier (or to a sub-part of the latter) by using the encryption key KY1 and the initialisation vector V1 so as to obtain the encrypted identifier SUCI. Also, based on the key KMAC1 the SIM 3 card calculates an authentication code MAC—noted MC1—of the encrypted identifier SUCI, by applying for example a MAC calculation function. The used MAC calculation function can for example be HMAC (FIPS 198-1, July 2008) with SHA-256 (FIPS 180-4 § 6.2, August 2015).

By way of example, the function F2 can be the encryption function AES (FIPS 197) in counter mode such as provided in the standard "SP800-38a § 6.5".

Via its access point 4, the SIM 3 card then sends (S50) the public key P as well as the encrypted identifier SUCI accompanied by the authentication code MAC MC1 to the network 6. The SIM 3 card sends the encrypted identifier SUCI into which it has inserted the authentication code MC1 for example. The public key P is integrated into the encrypted identifier SUCI for example, even though other implementations are possible.

The public key P allows the network 6 to decrypt the identifier SUCI so as to retrieve the SUPI identifier in its decrypted form, whereas the authentication code MAC MC1 allows the network 6 to verify the integrity of the encrypted identifier SUCI received from the SIM 3 card, as described hereinbelow.

More precisely, as illustrated in FIG. 4 originating from the SIM card 3 and via the access point 4, the network 6 receives (S60) the public key P of the SIM card, as well as the encrypted identifier SUCI accompanied by the authentication code MAC MC1.

The network 6 stores a secret key—noted a—associated with said network 6, the derivation function F1 and a decryption function F3 in memory.

During a calculation step S62, the network 6 calculates said at least one coordinate CD1 of the intermediate point SP1 of the elliptical curve E. In this example, the network 6 therefore calculates the unique coordinate CD1 (along x or y for example) used by the SIM 3 card to encrypt the SUPI identifier. To achieve this, the network 6 determines the coordinate CD1 of the intermediate point SP1. This intermediate point is equal to the product of the secret key a by the public key P, as defined hereinbelow:

$$[a]P=[a][k]G=[k][a]G=[k]Q=SP1$$

where the public key Q of the network 6 is equal to the product of the secret key a by the generator point G, as defined hereinbelow:

$$Q=[a]G$$

As indicated earlier, the network 6 stores its secret key a in memory. In this way, it can retrieve the coordinate CD1 of the intermediate point SP1 by calculation without having knowledge of the secret key k.

As illustrated in FIG. 4, the network 6 then derives (S64) the encryption key KY1, the initialisation vector V1 and, as appropriate, the MAC key noted KMAC1, by applying the key derivation function F1 identically to the derivation step S46 performed previously by the SIM 3 card. To achieve this, the network 6 applies the key derivation function F1 to the coordinate CD1 of the intermediate point SP1 obtained at S62. The key KY1 here acts as decryption key to decrypt the encrypted identifier SUCI.

As already indicated, the function F1 can be for example the derivation function provided in the standard "ANSI X9.63 Key Derivation Function, § 5.6.3", with other functions being possible.

During a verification step S66, the network 6 verifies the integrity of the encrypted identifier SUCI received at S60 from the SIM 3 card. To achieve this, based on the MAC key KMAC1 obtained at S64 the network 6 calculates an authentication code MAC—noted MC2—of the encrypted identifier SUCI provided by the SIM 3 card. The network 3 then compares (S70) the authentication code MC2 calculated at S68 to the authentication code MC1 received at S60 from the SIM 3 card. If the authentication codes MC1 and MC2 coincide, the network 6 deduces from this that the encrypted identifier SUCI received at S60 is integral. Otherwise, the encrypted identifier SUCI provided by the SIM 3 card is not integral.

If it is detected that the encrypted identifier SUCI received at S60 is integral (has not been altered), the network 6 decrypts (S72) the encrypted identifier SUCI according to the inverse principle of the encryption step S48 performed previously by the SIM 3 card. More particularly, the network 3 deciphers or decrypts (S72) the encrypted identifier SUCI (or a sub-part of the latter) based on the decryption key KY1 and the initialisation vector V1 obtained during the derivation step S64 so as to retrieve the SUPI identifier in its decrypted form. The network 6 applies a decryption function F3 (inverse to the encryption function F2 used at S48 by the SIM 3 card) in particular to the encrypted identifier SUCI (or to a sub-part of the latter) by using the decryption key KY1 and the initialisation vector V1 to obtain the SUPI identifier.

By way of example, the function F3 can be the decryption function AES (FIPS 197) in counter mode such as provided in the standard "SP800-38a § 6.5".

Based on the SUPI identifier obtained at S72, the network 6 can carry out authentication (S74) of the subscriber, as already described earlier in reference to FIGS. 1 and 2.

As already indicated, the cryptographic processing events of encryption and decryption carried out respectively by the SIM 3 card and by the network 6 allow the SIM 3 card to be authenticated securely with the network 6 without providing its SUPI identifier in its decrypted form. These cryptographic processing events are advantageous in that they especially combat non-authorised interceptions of identifiers SUPI by malevolent third parties.

However, the difficulty is that these cryptographic processing events can be particularly costly in resources and processing time, these costs not always being compatible with the resources available and the applicable time constraints. More particularly, the calculation (S42, FIG. 3) of the public key P (where P=[k]G) and the calculation (S44) of at least one coordinate CD1 of the intermediate point SP1 (with SP1=[k]Q) are consumers of resources and processing time particularly. The complexity of these two calculations results in particular from the fact that the secret key k is coded on a relatively large number of bits, specifically 256 bits (M=256), with other values of M being possible, however.

One aspect of the present disclosure therefore is especially to improve the cryptographic processing events executed by an embedded subscriber identity module to encrypt the SUPI identifier of a subscriber, also ensuring a good compromise between the level of security achieved and the required cost in resources and processing time. As already indicated, the present disclosure applies more generally to the effective and secure encryption or decryption of any data, whether these are subscriber identifiers (SUCI in the context of 5G or other) or any other data to be protected and distributed securely.

FIG. 5 schematically illustrates a cryptographic processing device DV1, also more simply called "device" later on, capable of cooperating with a telecommunications network HN1 via an access point AP1. It is assumed that here the device DV1 is an embedded subscriber identity module in a telecommunications terminal T1 and that the telecommunications network HN1 is a 5G mobile network. The device DV1 is therefore intended here in particular to authenticate a subscriber with the network HN1.

The device DV1 communicates with the network HN1 by means of the telecommunications terminal T1 which comprises appropriate communication means.

The subscriber identity module DV1 can take various forms, such as for example a SIM card or an eSIM card. The device DV1 can especially be a removable card or a device soldered in the terminal T1. Even though the device DV1 is embedded here in the terminal T1, variants are possible in which the device DV1 is not embedded in the terminal T1 but cooperates remotely with the latter.

In this example, the terminal T1 can be any client terminal compatible with 5G, such as a portable telephone (smartphone), a tablet, etc.

More precisely, in this example the device DV1 comprises at least one processor 20, a volatile memory (RAM) 22, a communication interface 24 and a non-volatile memory MR1.

In this example, the memory MR1 is a rewritable non-volatile memory or a read-only memory (ROM or EEPROM or FLASH), this memory constituting a recording medium (or data carrier) according to a particular embodiment, legible by the device DV1, and on which a computer program PG1 is registered according to a particular embodiment. This computer program PG1 comprises instructions for performing the steps of a cryptographic processing method according to a particular embodiment. The steps of this method are described hereinbelow in detail in particular embodiments.

The memory MR1 is especially capable of storing data DT1 to be encrypted according to embodiments. As indicated later on, it is assumed here that these data DT1 are, or at the very least include, a subscriber identifier of SUPI type (or sub-part of the latter) allowing authentication of a subscriber with a 5G network. Other types of subscriber identifiers are however possible. Embodiments can apply to encrypt any data to be protected. These data DT1 can be obtained (received, determined, etc.) by the device DV1 in any way.

The memory MR1 is also capable of storing data (or parameters) used during the cryptographic processing method of the present disclosure to encrypt these data DT1. In the example considered here, the memory MR1 is particularly capable of storing a generator point G, a public key Q associated with the network HN1, a derivation function F1 and an encryption function F2. The memory MR1 can also store data determined during the cryptographic processing method, especially a provisional generator point G' and a provisional key Q'. The nature and usage of these different parameters are described in more detail later.

The communication interface 24 is configured to let the device DV1 cooperate with the terminal T1 in which it is embedded. The device DV1 utilises the terminal T1 to communicate with the network distant HN1. The nature of this interface 24 can vary according to case.

It should be noted also that in memory the network HN1 comprises a secret key noted a, the derivation function F1, as well as a decryption function F3 corresponding to the inverse function of the encryption function F2 used by the device DV1 to encrypt data DT1.

It is evident that some elements generally implemented in a telecommunications terminal 5G and in an embedded subscriber identity module have been intentionally omitted as they are not necessary for comprehension of the present disclosure.

It should also be noted that the device DV1 shown in FIG. 5 constitutes just one embodiment, with other embodiments being possible within the scope of the present disclosure. The skilled person understands in particular that some elements of the device DV1 are described here only to make it easier to understand the present disclosure, these elements not being obligatory for carrying out the present disclosure.

As shown in FIG. 6 according to a particular embodiment, the processor 20 controlled by the computer program PG1 here implements an initialisation module MD1 and an encryption module MD7.

According to a particular example, the initialisation module MD1 is configured to execute an initialisation phase comprising:
  determination of a provisional generator point G' equal to a first product such as $G'=[d']G$, where d' is a first random scalar forming a first secret key of N bits and G is a generator point of an elliptical curve E; and
  determination of a provisional key Q' equal to a second product such as $Q'=[d']Q$, where Q is a point of the elliptical curve E forming a public key associated with the second system The elliptical curve ε used and the positive integer N can be selected by the skilled person case by case according to the application being considered. The value of N can be selected especially according to the preferred level of security and according to the cost constraints of resources and processing time. As indicated later on, N can be equal to 256 for example such that the first secret key d' is coded on 256 bits (other values being possible however).

The skilled person can adapt the value of N case by case. The size of N can be selected as a function especially of the size of the elliptical curve ε used (that is, the size of the order of the group of points generated by the generator point G). For example, if an elliptical curve ε of 384 bits is used the number of bits N will be selected here as being 384 bits. In this way, the value of N can be selected from one of the following values, for example: N=192, 224, 256, 384, 521 or 512 bits. The value of N can be selected as a function of the elliptical curve ε used (as a function of its size). Given that M is such that M<N, the value of M can also be selected as a function of the elliptical curve ε used.

As described later on, several implementations of the initialisation module MD1 are possible. The initialisation module MD1 can be configured to obtain or determine the provisional generator point G' and the provisional key Q' during the initialisation phase according to all appropriate methods. According to a particular example, the initialisation module MD1 is configured to receive the provisional generator point G' and the provisional key Q' from outside the device DV1. The provisional generator point G' and the provisional key Q' can be registered in the non-volatile memory MR1 so they can be retrieved and used later during the encryption phase as described later on.

According to a particular example, the initialisation module MD1 determines G' and Q' by calculation based on a scalar noted d'. To achieve this, the initialisation module MD1 can for example comprise a first determination module MD2 and a first calculation module MD4 as shown in FIG. 6, with other implementations being possible, however.

The first determination module MD2 is configured to determine a first scalar forming a first secret key d' of N bits.

The first calculation module MD4 is configured to:
  calculate a provisional generator point G' equal to the first product such as $G'=[d']G$; and
  calculate a provisional key Q' equal to the second product such as $Q'=[d']Q$.

The result obtained for G' and Q' can then be stored in memory in the device DV1 (in the live memory 22 or in the non-volatile memory MR1).

It should be remembered that embodiments are possible without the initialisation module executing modules MD2 and MD4 described hereinabove. The initialisation module MD1 can obtain G' and Q' in any way.

Also, the encryption module MD7 is configured to execute an encryption phase comprising the following steps:
  determination of a second random scalar forming a second secret key k of M bits, with M<N;
  calculation of a public key P associated with the device DV1, P being equal to a third product such as $P=[k]G'$;
  calculation of at least one coordinate CD1 of an intermediate point SP1, of the elliptical curve E, this intermediate point SP1 being equal to a fourth product such as $SP1=[k]Q'$;
  derivation of at least one key by application of a key derivation function to said at least one coordinate of the intermediate point SP1;
  encryption of data based on said at least one key derived during said derivation so as to obtain encrypted data; and
  sending to a second system of the public key P and the encrypted data for decryption by the second system.

The positive integer number M can be selected by the skilled person case by case according to the application in question (given that M<N), and especially according to the preferred level of security and according to the cost constraints of resources and processing time. It is considered for example that M is equal to 32, 48, 64 or 128 bits and that N is equal to 256 bits (other couples of values (N,M) being possible, however).

In the embodiments described hereinbelow, it is considered that the "second system" is the telecommunications network HN1, or more generally the network HN1 including its access point AP1.

As shown in FIG. 6 according to a particular example the encryption module MD7 can comprise a second determination module MD6, a second calculation module MD8, a module MD10 for derivation of keys, an encryption module MD12 and a sending module MD14, with other implementations being possible, however.

More specifically, the second determination module MD6 is configured to determine a second random scalar forming a second secret key k of M bits, with M<N.

The second calculation module MD8 is configured to calculate:
- a public key P associated with the device DV1, P being equal to a third product such as P=[k]G'; and
- at least one coordinate CD1 of an intermediate point SP1, of the elliptical curve E, this intermediate point SP1 being equal to a fourth product such as SP1=[k]Q'.

The module MD10 for derivation of keys is configured to derive at least one key by application of a key derivation function to said at least one coordinate CD1 of the intermediate point SP1 calculated by the second calculation module MD8.

The module MD12 for encryption of data is configured to encrypt based on said at least one key derived by the module MD10 for derivation of keys so as to obtain encrypted data.

The sending module MD14 is configured to send to the second system (i.e. to the network HN1 in this example) the public key P and the encrypted data for decryption by the second system.

The configuration and the functioning of the modules MD1-MD14 of the device DV1 will emerge precisely from the embodiments described hereinbelow. It should be noted that the modules MD1-MD14 such as shown in FIG. 6 illustrate only one non-limiting embodiment. In general, for each step of the cryptographic processing method of the present disclosure the cryptographic processing device can comprise a corresponding module configured to execute said step.

In general, one aspect of the present disclosure is that the generator point G used at step S42 (FIG. 3) to calculate the public key P on the one hand, and the public key Q used at step S44 (FIG. 3) to determine at least one coordinate CD1 of the intermediate point SP1 on the other hand are replaced during the encryption phase by a provisional generator point G' and a provisional key Q' respectively, as mentioned earlier. The provisional generator point G' and the provisional key Q' are both generated based on a secret key d' which is a random scalar coded on a number N of bits higher than the number M of bits on which the secret key k used during the encryption phase is coded. It is possible to retain a high level of security by choosing a relatively high number N (N=256 for example) while reducing the cost of calculations made during the encryption phase by limiting the number M (with M<N). As already indicated, the number N (greater than M) can be selected as a function of the elliptical curve ε used. The number N can for example correspond to the maximal security offered by the used elliptical curve ε.

To the extent where the secret key k is coded on a number M of bits lower than N, the complexity of calculations made to determine the public key P and at least one coordinate CD1 of an intermediate point SP1 remains moderated, ensuring a good compromise between level of security of the encryption and cost of resources and processing time. This compromise can be adjusted case by case by adapting the value of N and M to each situation.

As indicated later on, the provisional generator point G' and the provisional key Q' can be determined during an initialisation phase which precedes the encryption phase which advantageously obtains G' and Q' upstream and therefore accelerates the cryptographic processing events when the cryptographic processing device engages the encryption phase. Also, the same values of G' and Q' obtained during the initialisation phase can be used several times (i.e. during several iterations) of the encryption phase, which further accelerates the processing carried out by the device since it is unnecessary to execute the initialisation phase prior to each encryption phase.

A particular embodiment is now described in reference to FIGS. 7A-B. More precisely, the cryptographic processing device DV1 executes the cryptographic processing method by executing the program PG1 according to a particular embodiment.

It is assumed that in this example the device DV1 constituting an embedded subscriber identity module in the terminal T1 executes cryptographic processing aiming in particular to encrypt data DT1, then send the encrypted data—noted DTC1—obtained in this way to the telecommunications network HN1. In this example, the data DT1 to be encrypted are or comprise a SUPI identifier (or a sub-part of the latter) of the subscriber UR to the network HN1. As is well known to the skilled person, a SUPI identifier identifies a user with a 5G network to which he has subscribed. These data DT1 can be obtained (received, determined, etc.) by the device DV1 in any way.

As explained hereinbelow, the cryptographic processing executed by the device DV1 is based on the usage especially of an elliptical curve ε which the skilled person has selected as a function of the case of use.

More specifically, the device DV1 executes an initialisation phase S100 during which it determines a provisional generator point G' and a provisional key Q'.

The provisional generator point G' is equal to a first product such that:

$$G'=[d']G$$

where d' is a first random scalar forming a first secret key of N bits and G is a generator point of the above elliptical curve ε.

Also, the provisional key Q' is equal to a second product such that:

$$Q'=[d']Q$$

where Q is a point of the elliptical curve ε forming a public key associated with a second system, specifically the network HN1 in this example.

The level N of coding in bits of the secret key d' is for example fixed at 256 bits, or even more if an even higher level of security is required.

As already indicated, various ways for obtaining G' and Q' are possible. According to a first example, the device DV1 itself does not calculate G' and Q' but receives the latter from outside. The parameters G' and Q' are for example loaded into the device DV1 during its initial personalisation, or later while the device DV1 is already in service in the terminal T1.

According to another example shown in FIGS. 7A-B, the device DV1 itself calculates the parameters G' and Q' based on the first random scalar d'. This particular example is described in more detail hereinbelow. It is considered that the initialisation phase S100 comprises steps S101, S102 and S104 described hereinbelow.

During a determination step S101, the device DV1 determines a first random scalar d' which forms a first secret key of N bits. As indicated earlier, it is assumed that N is fixed at 256, or even more if need. In the example considered here, the device DV1 itself randomly generates the scalar d'. According to a variant, the device DV1 can receive this random scalar d' from outside (loading during personalisation for example, or after its execution).

The device DV1 calculates (S102) a provisional generator point G' of the elliptical curve ε, this provisional generator point G' being equal to the following first product:

$$G'=[d']G$$

where d' is the first random scalar determined at the determination step S101.

The device DV1 calculates (S104) also a provisional key Q' equal to the following second product:

$$Q'=[d']Q$$

where Q is a point of the elliptical curve ε forming a public key associated with a second system, specifically the network HN1 in this example.

To achieve this, the device DV1 extracts the parameters G and Q stored previously in its memory MR1. The calculation steps S102 and S104 can be performed simultaneously or according to any order.

Once the provisional generator point G' and the provisional key Q' are determined at S100, the device DV1 stores (S106, FIG. 7A) these parameters G' and Q' in its memory MR1 so it can use them during the following encryption phase S107.

During an encryption phase S107 (FIG. 7A), the device DV1 utilises the provisional generator point G' and the provisional key Q' obtained during the initialisation phase S100 to decrypt the above data DT1. As already indicated, it is assumed in this example that these data DT1 are or comprise a SUPI identifier (or a sub-part of the latter) of the subscriber UR to the network HN1 (FIG. 5). As described in detail hereinbelow, in this example the encryption phase S107 comprises steps S108, S110, S112, S114, S116 and S118.

During a determination step S108, the device DV1 determines a second random scalar forming a second secret key k of M bits, with M<N. The level M of coding in bits of the second secret key k is selected by the skilled person as a function of the compromise he wants to achieve in each case between level of security and cost of the cryptographic processing in terms of resources and processing time. The higher the level M of coding in bits, the more reinforced the security but the more necessary the resources and the higher the impact on the processing event speed during the encryption phase.

According to a particular example, N and M are selected such that N is equal to 256 bits and M is equal to 32, 48, 64 or 128 bits, other combinations (N, M) however being possible to the extent where the condition M<N is respected.

In an embodiment, the first secret key d' intervening in the cryptographic calculations during the initialisation phase S100 is coded on more bits (on N bits) than the second secret key k intervening in the cryptographic calculations during the encryption phase S107, this second secret key k being coded on only M bits, with M<N. The difference between M and N can be adjusted case by case. This has the cost of the processing based more on the initialisation phase S100 than on the encryption phase S107 which is critical and generally needs to be performed rapidly at any given instant. As indicated later on, the encryption phase S107 can be reiterated several times by using the same parameters G' and Q' obtained during the initialisation phase S100 so as to even further limit costs of resources and processing time.

The device DV1 then calculates (S110) a public key P associated with the device DV1, P being equal to a third product such that:

$$P=[k]G'=[k][d']G$$

The confidentiality of the discrete logarithm of this public key P ([k][d']) therefore depends on the size in bits N of the first secret key d' and on the size in bits M of the second secret key k.

During a calculation step S112, the device DV1 calculates at least one coordinate CD1 of an intermediate point SP1, said intermediate point SP1 being equal to a fourth product such as:

$$SP1=[k]Q'=[k][d']Q$$

Although this is possible, it is not necessary for the device DV1 to determine all the coordinates of the intermediate point SP1 on the elliptical curve ε. The device DV1 can calculate the coordinate CD1 according to a direction x and/or according to a direction y, these directions x and y defining a space in which the elliptical curve ε extends. It is assumed later on by way of simplicity that the device DV1 determines a single coordinate CD1 of the intermediate point SP1 during step S112.

During a derivation step S114, the device DV1 derives at least one key by application of a key derivation function F1 to the coordinate CD1 of the intermediate point SP1. In other words, the device DV1 executes the key derivation function F1 to determine at least one key based on the coordinate CD1 of the intermediate point SP1. The nature and the number of keys can vary according to the case of use, and in particular according to the types of encryption and the function F1 considered. During step S114, the device DV1 can generate a single key or a plurality of keys, the key or keys being used in the following encryption step S116 to decrypt the data DT1.

It is assumed that in this example application of the derivation function F1, taking the coordinate CD1 into account, produces separate parameters (or components), specifically an encryption key KY1, an initialisation vector V1 and a MAC key noted KMAC1. A variant is possible in which the key KMAC1 does not intervene, as described hereinbelow.

It should be noted that part of the encryption phase S107 can be performed in advance, that is, before the data DT1 to be encrypted are determined or obtained by the device DV1, or before the device DV1 determines that the data DT1 must be encrypted.

According to a particular example, prior to the encryption step S116 yet to come the method comprises a step (not shown in the figure) for obtaining the data DT1 to be encrypted and/or a step for determining that the data DT1 must be encrypted. These data DT1 can be received or determined in any way. According to a particular example, step S108 for determination of the secret key k, step S110 for calculation of the public key P and step S112 for calculation of at least one coordinate CD1 of an intermediate point SP1, or even the derivation step S114 (or at least some of these steps), are performed in advance, that is, before the device DV1 obtains the data DT1 to be encrypted or before the device DV1 determines that the data DT1 must be encrypted, to yet further accelerate the encryption method.

During an encryption step S116, the device DV1 encrypts the data DT1 based on the encryption key KY1 and the initialisation vector V1 which have been previously derived during derivation step S114 so as to obtain the encrypted data DTC1. In the example considered here, the device DV1 applies an encryption function F2 to encrypt the data DT1 based on the encryption key KY1 and the initiation vector V1. As indicated earlier, the encryption function F2 is stored in this example in the memory MR1 of the device DV1. The encryption step S116 encrypts the subscriber SUPI identifier (or a sub-part of the latter) included in the data DT1 so as to produce encrypted data DTC1 comprising the encrypted identifier SUCI (or a sub-part of the latter) which corresponds to the encrypted version of the SUPI.

In this example, it is also considered that during encryption step S116 the device DV1 calculates an authentication code MAC—noted MC1—based on the encrypted data DTC1 and the key KMAC1. The authentication code MAC is calculated based on the encrypted data DTC1 according to any appropriate method. As is well known to the skilled person, a code MAC is a code accompanying the data to ensure the integrity of the latter, by allowing later verification of the code MAC after distribution or processing of the data in question. In this way, in the present case the authentication code MC1 lets the network HN1 verify later on that the received encrypted data DTC1 are integral (have not undergone alterations).

During a sending step S118, the device DV1 then sends to the network HN1 (the second system) the public key P calculated at S110 and the encrypted data DTC1 for decryption by the network HN1. In this example, the device DV1 performs transmission S118 via the access point AP1 of the network HN1. As described later on, the network HN1 can then decrypt the received encrypted data TDC1.

More particularly, the public key P allows the network HN1 to recalculate the coordinate CD1 of the intermediate point SP1 based on a scalar forming a secret key—noted a—of the network HN1, in which:

$$SP1=[a]P$$

The coordinate CD1 of the intermediate point SP1 then lets the network HN1 decrypt the encrypted data DTC1, without having knowledge of the secret keys k and d', as explained later.

In the example considered here, apart from the public key P and the encrypted data DTC1, during step S118 the device DV1 sends the authentication code MC1 calculated at S116 to the network HN1 to let the network HN1 verify the integrity of the received encrypted data DTC1 later on. The device DV1 can insert the authentication code MC1 into the encrypted data DTC1 before sending S118 to the network HN1. By way of variant, the authentication code MC1 is sent (S118) to accompany the encrypted data DTC1.

It should be noted that embodiments can be implemented without using or sending a code MAC. But usage of a code MAC is advantageous to the extent where it allows the receiving entity (the network HN1 in this example) to verify the integrity of the received encrypted data DTC1.

Embodiments execute cryptographic processing (for example of Diffie-Hellman type) based on the elliptical curves which encrypt (or decrypt, as described hereinbelow) the data by ensuring a good compromise between the level of security attained and the required cost of resources and processing time. To achieve this, the generator point G and the public key Q used to calculate the public key P and the intermediate point SP1 (or at least one coordinate CD1 of SP1) respectively in steps S42 and S44 as described earlier in reference to FIG. 3, are replaced respectively by a provisional generator point G' and a provisional key Q' obtained during an initialisation phase, these parameters G' and Q' both depending on the same secret key d' coded on N bits.

A high level of security is ensured especially due to usage of a first secret key d' coded on a number N of bits to determine the provisional generator point G' and the provisional public key Q'. The provisional generator point G' and the provisional public key Q' occur in calculating the public key P and the coordinate CD1 of the intermediate point SP1 during the encryption phase, reinforcing the security of these calculations. In this way, the values of the public key P and of the coordinate CD1 depend not only on the second secret key k (coded on M bits) but also on the first secret key d' (coded on N bits).

Also, it is possible to limit resources needed for the device DV1 to determine the public key P and the coordinate CD1, or at least improve management of these resources, by breaking down the calculations of these two elements into two phases. During the initialisation phase S100 the device DV1 can obtain the provisional generator point G' and/or the provisional key Q' from outside or determine it by calculation at the right time, for example upstream of the encryption phase S107, for example during a period of inactivity or at least when the necessary resources are available. It is accordingly possible to accelerate the speed of the encryption of the data DT1 by determining in advance, during an initialisation phase, the provisional generator point G' and the provisional key Q' for immediate use when the encryption phase is triggered, also irrespective of the data to be encrypted.

In embodiments, cryptographic calculations which are most expensive in time and resources are performed during the initialisation phase S100 prior to initiating the encryption phase S107. With the first secret key d' being coded on more bits than the second secret key k, the initialisation phase S100 concentrates the most expensive calculations. The calculation operations during the encryption phase S107 are therefore less costly to the extent where k occurring in the third and fourth products (S110 and S112) is lower in resolution.

According to a particular example, the encryption phase S107 (FIG. 7A) is triggered on detection of at least one event, the initialisation phase S100 being performed prior to detection of said at least one event.

The encryption phase S107 (FIG. 7A) of the data DT1, comprising the SUPI identifier (or a sub-part of the latter), is triggered for example in response to the receiving, from the access point AP1, of a request for registering (for example a "registration request" or a "Identity Request" such as provided in the standard ETSI TS 133 501, for example in the Version 15.3.1 Release 15) of the device DV1 with the network HN1.

According to a particular example, the initialisation phase S100 occurs a single time only, for example during initial start-up of the device DV1 or during manufacture of the device DV1 (for example during its pre-personalisation or personalisation).

As described later on in particular examples, the initialisation phase S100 can also occur multiple times, preferably during predefined periods conducive to this type of processing.

Also, the way in which the network HN1 decrypts the encrypted data DTC1 provided at S118 (FIG. 7B) by the device DV1 is not modified by the encryption method executed by the device DV1. In other words, the network HN1 can decrypt the data DTC1 provided at S118 (FIG. 7B) by the device DV1 according to the same method as that described earlier in reference to FIG. 4.

In reference to FIG. 8, a processing method executed by the network HN1 to decrypt the data DTC1 previously encrypted by the device DV1 according to an embodiment is now described hereinbelow.

During a receiving step S130, via its access point AP1 the network HN1 receives the encrypted data DTC1 and the public key P provided by the device DV1. It is assumed here that the authentication code MC1 is included in the encrypted data DTC1.

During a calculation step S132, identically to the calculation step S62 (FIG. 4) previously described the network HN1 calculates said at least one coordinate CD1 of the intermediate point SP1 of the elliptical curve ε, that is, in this example the coordinate CD1 determined at S112 (FIG. 7A) by the device DV1. In this example, the network 6 therefore calculates the unique coordinate CD1 (along x or y for example) used by the device DV1 to encrypt the data DT1.

The intermediate point SP1 is equal to the product of the secret key—noted a—of the network HN1 by the public key P, as defined hereinbelow:

$$[a]P=[a][k][d']G=[k][d'][a]G=[k][d']Q=[k]Q'=SP1$$

given that the public key Q of the network HN1 is equal to the product of the secret key a by the generator point G, as defined hereinbelow:

$$Q=[a]G$$

As indicated earlier, the network HN1 has stored in memory its secret key a. Therefore, by way of calculation it can retrieve the coordinate CD1 of the intermediate point SP1 without having knowledge of the first secret key d' or of the second secret key k.

As illustrated in FIG. 8, the network HN1 then performs steps S134, S136, S138, S140, S142 and S144 identically respectively to steps S64, S66, S68, S70, S72 and S74 such as already described earlier in reference to FIG. 4.

More particularly, the network HN1 then derives (S134) the encryption key KY1, the initialisation vector V1 and, as appropriate, the MAC key noted KMAC1, by applying the key derivation function F1 identically to the derivation step S114 performed previously by the device DV1. To achieve this, the network HN1 apples the key derivation function F1 to the coordinate CD1 of the intermediate point SP1 obtained at S132. The key KY1 here acts as decryption key to decrypt the encrypted data DTC1 comprising the encrypted identifier SUCI.

During a verification step S136, the network HN1 verifies the integrity of the encrypted data DTC1 received at S130 from the device DV1. To achieve this, based on the MAC key KMAC1 obtained at S134 the network HN1 calculates an authentication code MAC—noted MC2—of the encrypted data DTC1 provided by the device DV1. The network HN1 then compares (S140) the authentication code MC2 calculated at S138 to the authentication code MC1 received at S130 originating from the device DV1. If the authentication codes MC1 and MC2 coincide, the network HN1 deduces from this that the encrypted data DTC1 received at S130 are integrated and the method then performs the decryption step S142. Otherwise, the received encrypted data DTC1 are not integral and the decryption method ends.

During the decryption step S142, the network HN1 decrypts the encrypted data DTC1 (comprising the encrypted identifier SUCI or part of the latter) according to the inverse principle of the encryption step S116 (FIG. 7B) performed previously by the device DV1. More particularly, the network HN1 deciphers or decrypts (S142) the encrypted data DTC1 based on the decryption key KY1 and the initialisation vector V1 obtained during the derivation step S134 so as to retrieve the data DT1 in decrypted form, including the subscriber identifier SUPI (or a sub-part of the latter). To achieve this, the network HN1 applies in particular a decryption function F3 (where F3 is the inverse function of the encryption function F2 used at S116 by the device DV1) to the encrypted data DTC1 by using the decryption key KY1 and the initialisation vector V1 so as to obtain the decrypted data DT1.

Based on the SUPI identifier included in the data DT1 determined at S142, the network HN1 can carry out authentication (S144) of the subscriber, as already described earlier in reference to FIGS. 1 and 2.

As already indicated, the cryptographic processing events of encryption and decryption executed respectively by the device DV1 and by the network HN1 in this particular case allow the device DV1 to later be authenticated securely with the network HN1 without supplying the SUPI identifier of the subscriber in its decrypted form. These cryptographic processing events are advantageous in that they especially combat unauthorised interceptions of SUPI identifiers by malevolent third parties, thus reinforcing the security of the personal data and private life of users.

According to a particular example, the sequence of steps S100-S118 described earlier in reference to FIGS. 7A-B is executed multiple times to encrypt and send the data DT1 in encrypted form to a second system or second systems. The initialisation phase S100 can be reiterated prior to each iteration of the encryption phase S107.

Embodiments are also advantageous in that it is possible to carry out several iterations of the encryption phase S107 by using the same provisional generator point G' and the same provisional key Q' determined during the initialisation phase S100, which further reduces costs needed for resources and processing time to carry out encryptions of data DT1. It is unnecessary to carry out the initialisation phase S100 prior to each encryption phase S107.

In this way, as shown in FIG. 9 in a particular embodiment the device DV1 executes the initialisation phase S100 as described previously, and then executes at least two successive iterations of the encryption phase S107 based on the provisional generator point G' and the provisional key Q' determined during the initialisation phase S100 to encrypt the data DT1 which are sent to the second system (the network HN1) for decryption. It should be noted that the data DT1 which are encrypted at each iteration of the encryption phase S107, as well as the second system to which these encrypted data DT1 are sent, can vary.

In this way, the keys G' and Q' coming from the first and second products S102, S104 during the initialisation phase S100 can be used several times, during multiple successive iterations of the encryption phase S107 to communicate with one or more second systems, for example for authenticating a subscriber UR several times over time with one or more telecommunications networks. It is unnecessary to execute the initialisation phase prior to every encryption phase. The initialisation phase S100 can be carried out for example every X phases of encryption S107 (or X is an integer greater than or equal to 2).

This limits the processing time during the cryptographic calculations made by the device DV1 while ensuring a high level of security due to the fact that not only the secret key k but also the secret key d' affect the products during the encryption phase S107.

Also, it is possible to carry out multiple iterations of the initialisation phase S100 so as to renew (modify) the provisional generator G' and the provisional key Q' which are used during different iterations of the encryption phase S107 to encrypt data DT1.

According to a particular embodiment, the device DV1 monitors the number of successive iterations of the encryption phase S107 made with the same provisional generator point G' and the same provisional key Q' determined during the initialisation phase S100. On detecting that at least X successive iterations of the encryption phase S107 have been carried out, based on the same provisional generator point G' and the same provisional key Q' determined during the initialisation phase S100 to send encrypted data DTC1 to the second system (specifically the network HN1 in this example), the device DV1 performs a new iteration of the initialisation phase S100 to renew (and therefore modify) the provisional generator G' and the provisional key Q' based on a new first secret random key d' different to the first secret random key d' determined during the preceding iteration of the initialisation phase S100. The renewed provisional generator G' and the renewed provisional key Q' are used during at least one later iteration of the encryption phase S107 to encrypt new data DT1 and to send these new encrypted data DTC1 to a second system (specifically the network HN1 in this example).

The number X is an integer such that X 1. According to a particular example, X 2 this means that the device carries out at least two successive iterations of the encryption phase S107 with the same values of G' and Q' prior to renewing these values in light of performing a new encryption.

The device DV1 can therefore periodically renew the parameters G' and Q' to reinforce security and also maintain good processing performance, for example for authenticating the device DV1 with the network HN1 several times. In particular, regular renewal of the parameters G' and Q' (and therefore of the first secret key d') prevents a malevolent third party from tracing the device DV1 during the time when the latter is being registered as an embedded subscriber identity module with a telecommunications network. It is in fact difficult for a third party to trace a user based on public keys P exchanged during various iterations of the encryption phase or of the method, since these keys are not differentiated solely by the secret key k but by this secret key k and by the provisional generator point G'.

To achieve this, the device DV1 can utilise a counter CT to monitor the number of times the same couple (G', Q') has been used to authenticate with the network.

A particular embodiment is now described in reference to FIG. 10. It is assumed that the device DV1 executes the encryption phase S107 as already described previously. On detecting that this encryption phase S107 is executed (or initiated, or during execution), the device DV1 also updates (S162) a counter CT1. In this example, the counter CT1 is incremented by 1 at each new iteration of the encryption phase S107.

Then, on detecting that a new encryption must be carried out, the device DV1 determines (S164) based on the current value of its counter CT1 whether at least X successive iterations of the encryption phase S107 have been carried out with the same values of G' and Q'. To achieve this, the device DV1 determines whether the counter CT1 is greater than or equal to the threshold value X. In the affirmative, the method continues at S100 to renew the parameters G' and Q' during a new iteration of the initialisation phase S100 and to reinitialise the counter CT1, if not the device DV1 executes a new iteration of the encryption phase S107 without modifying the parameters G' and Q'.

In this way, during the new iteration of the initialisation phase S100, the device DV1 renews (modifies) the provisional generator G' and the provisional key Q'. The device DV1 then carries out a new iteration of the encryption phase S107 by using the renewed values of G' and Q' obtained at S100, and so on.

According to a particular embodiment illustrated in FIG. 11, at each iteration of the encryption phase S107, the provisional generator G' and the provisional key Q' used during the current iteration of said encryption phase S107 are equal respectively to the public key P and to the intermediate point SP1 which have been calculated during the preceding iteration of the encryption phase S107.

More generally, for at least one iteration of the encryption phase S107 the provisional generator G' and the provisional key Q' used during the current iteration of said encryption phase S107 can be equal to the public key P and to the intermediate point SP1 respectively, which have been calculated during the preceding iteration of the encryption phase S107.

In other words, the parameters G' and Q' of the current iteration are replaced by the values [k]G' and [k]Q' of the preceding iteration of the encryption phase S107, which reinforces security to the extent where it is more difficult for a malevolent third party (interceptor of identifiers) to trace an embedded subscriber identity module based on the successive SUCI generated by said module to authenticate with a telecommunications network.

It should be noted however that even though this is possible, it is not obligatory to use the same value of the secret key k at each iteration of the encryption phase S107.

As illustrated in FIG. 11, the following can be used:
a secret key $k_1$ at iteration I1 (S180) such that:

$P=[k_1]G'$ and $SP1=[k_1]Q$;

a secret key $k_2$ at iteration I2 (S182) such that:

$P=[k_1][k_2]G'$ and $SP1=[k_1][k_2]Q'$;

a secret key $k_3$ at iteration I3 (S182) such that:

$P=[k_1][k_2][k_3]G'$ and $SP1=[k_1][k_2][k_3]Q'$; etc.

In this way, at iteration $I_R$ (S186) with R an integer at least equal to 2, P and SP1 are such that: $P=[k_1][k_2] \ldots [k_R]G'$ and $SP1=[k_1][k_2] \ldots [k_R]Q'$.

In a particular case, the same value of the secret key k is used for each iteration. In this way, at iteration $I_R$ (S186), P and SP1 are such that: $P=[k]^R G'$ and $SP1=[k]^R Q'$.

The embodiments described earlier relate to the case of the encryption of data. As already indicated, embodiments are not limited to this particular case however, and can be applied to the decryption of encrypted data also. To achieve this, embodiments also provide a second cryptographic processing method which is based on a principle similar to the first cryptographic processing method described earlier.

In this way, according to a particular embodiment, the device DV1 is configured to execute a second cryptographic processing. According to this particular mode, the device DV1 cooperates with any second system (noted HN1), said method comprising:

an initialisation phase comprising:
  determination of a provisional generator point G' equal to a first product such as G'=[d']G, where d' is a first random scalar forming a first secret key of N bits and G is a generator point of an elliptical curve; and
  determination of a provisional key Q' equal to a second product such as Q'=[d']Q, where Q is a point of the elliptical curve forming a public key associated with the second system; and a decryption phase comprising:
  determination of a second random scalar forming a second secret key k of M bits, with M<N;
  calculation of a public key P associated with the device, P being equal to a third product such as P=[k]G';
  sending of the public key P to a second system;
  receiving of encrypted data originating from the second system;

calculation of at least one coordinate of an intermediate point SP1, of the elliptical curve, equal to a fourth product such as SP1=[k]Q';

derivation of at least one key by application of a key derivation function to said at least one coordinate of the intermediate point SP1; and decryption of the encrypted data based on said at least one key derived during said derivation so as to obtain decrypted data.

The initialisation phase can be executed similarly to the initialisation phase S100 described previously (FIG. 7A). In particular, determining the key random d', as well as the calculations of the principal key G' and the provisional public key Q' can be performed respectively similarly to steps S101, S102 and S104 described previously.

The decryption phase can also be executed similarly to the encryption phase S107 described previously (FIG. 7A). In particular, determination of a second secret key k and calculation of a public key P can be carried out respectively similarly to steps S108 and S110 described previously. Similarly, calculation of at least one coordinate of an intermediate point SP1 and derivation of at least one key by application of a key derivation function can be executed respectively similarly to steps S112 and S114 described previously. Finally, decryption of the encrypted data can be carried out similarly to the encryption step S116 described previously.

It should be noted that the order in which the steps of the cryptographic processing methods are performed such as described in the embodiments earlier constitutes just one embodiment, with variants being possible.

A skilled person will understand that the embodiments and variants described earlier constitute non-limiting examples of embodiments of the present disclosure. In particular, the skilled person could envisage any adaptation or combination of the embodiments and variants described earlier so as to respond to a particular need.

The invention claimed is:

1. A cryptographic processing method executed by a device cooperating with a system, said method comprising:

in an initialisation phase:
determining a provisional generator point G' equal to a first product such that G'=[d']G, where d' is a first random scalar forming a first secret key of N bits and G is a generator point of an elliptical curve; and
determining a provisional key Q' equal to a second product such that Q'=[d']Q, where Q is a point of the elliptical curve forming a first public key associated with the system; and in an encryption phase:
determining a second random scalar forming a second secret key k of M bits, with M<N;
calculating a second public key P associated with the device, P being equal to a third product such that P=[k]G';
calculating at least one coordinate of an intermediate point SP1, of the elliptical curve, equal to a fourth product such that SP1=[k]Q';
deriving at least one key by application of a key derivation function to said at least one coordinate of the intermediate point SP1;
encrypting data based on said at least one key derived during said derivation so as to obtain encrypted data; and
sending the second public key P and the encrypted data to the system for decryption by the system.

2. The method according to claim 1, wherein the second public key P allows the system to recalculate said at least one coordinate of the intermediate point SP1 based on a scalar forming a third secret key "a" of the system, where SP1=[a]P, and wherein said at least one coordinate of the intermediate point SP1 allows the system to decrypt the encrypted data.

3. The method according to claim 1, wherein the initialisation phase comprises:
determining the first random scalar forming said first secret key d' of N bits;
calculating the provisional generator point G' equal to the first product such that G'=[d']G; and
calculating the provisional key Q' equal to the second product such that Q'=[d']Q.

4. The method according to claim 1, wherein, following the initialisation phase, the method comprises registering the provisional generator G' and the provisional key Q' in a non-volatile memory of the device.

5. The method according to claim 1, wherein the encryption phase is triggered on detection of at least one event, said initialisation phase being performed prior to said detection.

6. The method according to claim 1, wherein during said derivation of at least one key, the application of the key derivation function to said at least one coordinate of the intermediate point SP1 produces an encryption key, an initialisation vector and a MAC key, and wherein said encrypting data based on said at least one key derived during said derivation so as to obtain encrypted data comprises:
applying an encryption function to encrypt said data based on the encryption key and the initialisation vector; and
calculating an authentication code MAC based on the encrypted data and the MAC key;
wherein, apart from the second public key P and the encrypted data, the device sends the authentication code MAC to the system to let the system verify the integrity of the encrypted data.

7. The method according to claim 1, wherein the device executes at least two successive iterations of the encryption phase, based on said provisional generator point G' and said provisional key Q' determined during the initialisation phase, to encrypt data sent to the system for decryption.

8. The method according to claim 1, wherein for at least one iteration of the encryption phase the provisional generator G' and the provisional key Q' used during the current iteration are equal respectively to the second public key P and to the intermediate point SP1 calculated during the preceding iteration of the encryption phase.

9. The method according to claim 1, wherein, on detection that, based on said provisional generator point G' and said provisional key Q' determined during the initialisation phase, the device has carried out at least X successive iterations of the encryption phase to send encrypted data to the system, X being an integer such that X 1, the method also comprises:
executing a new iteration of the initialisation phase to renew the provisional generator G' and the provisional key Q' based on a new first secret random key d' different to the first secret random key determined during the preceding iteration of the initialisation phase; and
using the renewed provisional generator G' and the renewed provisional key Q' during at least one later iteration of the encryption phase to send new encrypted data to the system.

10. The method according to claim 1, wherein:
the system is a telecommunications network;
the device is an embedded subscriber identity module of a terminal for authenticating said terminal with the telecommunications network;
the data comprises an identifier of the embedded subscriber identity module;
during said encrypting, the identifier is encrypted based on said at least one key derived during said derivation so as to obtain an encrypted identifier; and
during said sending, the second public key P and the encrypted identifier are sent to an access point of the telecommunications network to allow said embedded subscriber identity module to be authenticated with said telecommunications network.

11. The method according to claim 10, wherein the encryption phase is triggered on detection of at least one event, said initialisation phase being performed prior to said detection, and
wherein said at least one event comprises receiving, from the access point of the telecommunications network, a request for registering the embedded subscriber identity module with said telecommunications network.

12. The method according to claim 10, wherein the telecommunications network is a 5G mobile network and the identifier of the embedded subscriber identity module is a SUPI identifier.

13. A cryptographic processing method executed by a device cooperating with a system, said method comprising:
in an initialisation phase:
determining a provisional generator point G' equal to a first product such that G'=[d']G, where d' is a first random scalar forming a first secret key of N bits and G is a generator point of an elliptical curve; and
determining a provisional key Q' equal to a second product such as Q'=[d']Q, where Q is a point of the elliptical curve forming a fir public key associated with the system; and
in a decryption phase:
determining a second random scalar forming a second secret key k of M bits, with M<N;
calculating a second public key P associated with the device, P being equal to a third product such that P=[k]G';
sending the second public key P to a system;
receiving encrypted data originating from the system;
calculating at least one coordinate of an intermediate point SP1, of the elliptical curve, equal to a fourth product such as SP1=[k]Q';
deriving at least one key by application of a key derivation function to said at least one coordinate of the intermediate point SP1; and
decrypting the encrypted data based on said at least one key derived during said derivation so as to obtain decrypted data.

14. A cryptographic processing device capable of cooperating with a system, comprising:
a processor; and
a memory storing instructions that, when executed by the processor, cause the processor to:

in an initialisation phase:
determine a provisional generator point G' equal to a first product such that G'=[d']G, where d' is a first random scalar forming a first secret key of N bits and G is a generator point of an elliptical curve; and
determine a provisional key Q' equal to a second product such as Q'=[d']Q, where Q is a point of the elliptical curve forming a first public key associated with the system; and
in an encryption phase:
determine a second random scalar forming a second secret key k of M bits, with M<N;
calculate a second public key P associated with the device, P being equal to a third product such as P=[k]G';
calculate at least one coordinate of an intermediate point SP1, of the elliptical curve, equal to a fourth product such as SP1=[k]Q';
derive at least one key by application of a key derivation function to said at least one coordinate of the intermediate point SP1;
encrypt data based on said at least one key derived during said derivation so as to obtain encrypted data; and
send the second public key P and the encrypted data to the system for decryption by the system.

15. A cryptographic processing device capable of cooperating with a system, comprising:
a processor; and
a memory storing instructions that, when executed by the processor, cause the processor to:
in an initialisation phase:
determine a provisional generator point G' equal to a first product such as G'=[d']G, where d' is a first random scalar forming a first secret key of N bits and G is a generator point of an elliptical curve; and
determine a provisional key Q' equal to a second product such as Q'=[d']Q, where Q is a point of the elliptical curve forming a first public key associated with the system; and
in a decryption phase:
determine a second random scalar forming a second secret key k of M bits, with M<N;
calculate a second public key P associated with the device, P being equal to a third product such as P=[k]G';
send the second public key P to a system;
receive encrypted data originating from the system;
calculate at least one coordinate of an intermediate point SP1, of the elliptical curve, equal to a fourth product such that SP1=[k]Q';
derive at least one key by application of a key derivation function to said at least one coordinate of the intermediate point SP1; and
decrypt the encrypted data based on said at least one key derived during said derivation so as to obtain decrypted data.

* * * * *